United States Patent
Chen et al.

(10) Patent No.: US 10,374,847 B2
(45) Date of Patent: *Aug. 6, 2019

(54) MODULATION CODING SCHEME (MCS) INDICATION IN LTE UPLINK

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/059,824

(22) Filed: Aug. 9, 2018

(65) Prior Publication Data
US 2018/0375697 A1    Dec. 27, 2018

Related U.S. Application Data

(63) Continuation of application No. 14/617,888, filed on Feb. 9, 2015, now Pat. No. 10,075,309.
(Continued)

(51) Int. Cl.
*H04L 27/00* (2006.01)
*H04W 74/00* (2009.01)
*H04L 1/00* (2006.01)

(52) U.S. Cl.
CPC ........ *H04L 27/0008* (2013.01); *H04L 1/0003* (2013.01); *H04L 1/0016* (2013.01);
(Continued)

(58) Field of Classification Search
CPC . H04L 27/0008; H04L 1/0003; H04L 1/0016; H04L 1/0025; H04L 1/0029; H04L 1/0031; H04W 74/006
(Continued)

(56) References Cited

U.S. PATENT DOCUMENTS 9,351,293 B2    5/2016    Chen et al.
9,419,772 B2    8/2016    Kim et al.
(Continued)

FOREIGN PATENT DOCUMENTS

CN    102301792 A    12/2011
CN    102624481 A    8/2012
(Continued)

OTHER PUBLICATIONS

Broadcom Corporation: "MCS table design for 256 QAM", 3GPP Draft; R1-141501 MCS Design for 256QAM, 3rd Generation Partnership Project (3GPP), Mobile Competence Centre ; 650, Route Des Lucioles ; F-06921 Sophia-Antipolis Cedex ; France vol. RAN WG1, No. Shenzhen, China; Mar. 31, 2014-Apr. 4, 2014 Mar. 30, 2014 (Mar. 30, 2014), XP050787170, Retrieved from the Internet: URL:http://www.3gpp.org/ftp/Meetings_3GPP_SYNC/RAN1/Docs/.
(Continued)

*Primary Examiner* — Mark H Rinehart
*Assistant Examiner* — Kokou R Detse
(74) *Attorney, Agent, or Firm* — Holland & Hart LLP

(57) ABSTRACT

Methods, systems, and devices for indicating a modulation coding scheme (MCS) in LTE are described. A user equipment (UE) may receive downlink control information (DCI) from an evolved Node B (eNB) that includes an uplink grant of resources. The DCI may be configured and have a format that conveys an MCS table reference. The UE may identify the MCS table reference and, based on the reference, identify a legacy MCS table or a non-legacy MCS table. The legacy MCS table may be associated with quadrature amplitude modulation (QAM) up to a first order, and the non-legacy MCS table may be associated with QAM up to a second order, the second order being higher than the first
(Continued)

order. The UE may modulate and code information for uplink transmissions using the identified MCS table.

30 Claims, 17 Drawing Sheets

Related U.S. Application Data

(60) Provisional application No. 61/984,701, filed on Apr. 25, 2014.

(52) U.S. Cl.
CPC .......... *H04L 1/0025* (2013.01); *H04L 1/0029* (2013.01); *H04L 1/0031* (2013.01); *H04W 74/006* (2013.01)

(58) Field of Classification Search
USPC ........................................................ 370/329
See application file for complete search history.

(56) References Cited

U.S. PATENT DOCUMENTS

| | | | |
|---|---|---|---|
| 10,075,309 B2* | 9/2018 | Chen | ............ H04L 1/0016 |
| 2010/0195575 A1 | 8/2010 | Papasakellariou et al. | |
| 2011/0026623 A1 | 2/2011 | Srinivasa et al. | |
| 2011/0268069 A1 | 11/2011 | Song et al. | |
| 2012/0170525 A1 | 7/2012 | Sorrentino | |
| 2013/0182654 A1 | 7/2013 | Hariharan et al. | |
| 2013/0188566 A1 | 7/2013 | Zhu et al. | |
| 2014/0105158 A1* | 4/2014 | Kim | ............ H04W 72/042 370/329 |
| 2014/0313985 A1 | 10/2014 | Nimbalker et al. | |
| 2015/0023199 A1 | 1/2015 | Ishida et al. | |
| 2015/0173048 A1 | 6/2015 | Seo et al. | |
| 2015/0312071 A1 | 10/2015 | Chen et al. | |
| 2015/0358111 A1 | 12/2015 | Marinier et al. | |

FOREIGN PATENT DOCUMENTS

| | | |
|---|---|---|
| CN | 102934381 A | 2/2013 |
| CN | 103299574 A | 9/2013 |
| KR | 20130005271 A | 1/2013 |
| WO | WO-2011032035 A2 | 3/2011 |
| WO | WO-2011125700 A1 | 10/2011 |

OTHER PUBLICATIONS

International Search Report and Written Opinion—PCT/US2015/026645—ISA/EPO—Jul. 23, 2015.

IPEA/EPO, Second Written Opinion of the International Preliminary Examining Authority, Int'l. App. No. PCT/US2015/026645, dated Apr. 12, 2016, European Patent Office, Munich, DE, 10 pgs.

LG Electronics: "Further details on256QAM operation", 3GPP Draft; R1-141338, 3rd Generation Partnership Project (3GPP), Mobile Competence Centre ; 650, Route Des Lucioles ; F-06921 Sophia-Antipolis Cedex ; France vol. RAN WG1, No. Shenzhen, China; Mar. 31, 2014-Apr. 4, 2014 Mar. 30, 2014 (Mar. 30, 2014), XP050787010, Retrieved from the Internet: URL:http://www.33gpp.org/ftp/Meetings_3GPP_SYNC/RAN1/Docs/.

Panasonic: "MCS Indication for 256QAM", 3GPP Draft; R1-141212, 3rd Generation Partnership Project (3GPP), Mobile Competence Centre ; 650, Route Des Lucioles ; F-06921 Sophia-Antipolis Cedex ; France vol. RAN WG1, No. Shenzhen, China; Mar. 31, 2014-Apr. 4, 2014 Mar. 30, 2014 (Mar. 30, 2014), XP050786887, Retrieved from the Internet: URL:http://www.3gpp.org/ftp/Meetings_3GPP_SYNC/RAN1/Docs/.

Samsung: "Discussion on 256QAM related signaling/procedure", 3GPP Draft; R1-141286, 3rd Generation Partnership Project (3GPP), Mobile Competence Centre ; 650, Route Des Lucioles ; F-06921 Sophia-Antipolis Cedex ; France vol. RAN WG1, No. Shenzhen, China; Mar. 31, 2014-Apr. 4, 2014 Mar. 30, 2014 (Mar. 30, 2014), XP050786958, Retrieved from the Internet: URL:http://www.3gpp.org/ftp/Meetings_3GPP_SYNC/RAN1/Docs/.

ZTE: "Discussion on Multiplexing of Different DCI Messages," 3GPP Draft; R1-113751 Discussion on Multiplexing of Different DCI Messages, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Nov. 14, 2011-Nov. 18, 2011, Nov. 9, 2011 (Nov. 9, 2011), XP050562244, [retrieved on Nov. 9, 2011].

* cited by examiner

| CQI Index | Modulation | Code Rate (x1024) | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 4

| MCS Index | Modulation Order | TBS Index | Redundancy Version ($rv_{idx}$) |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | Reserved | | 1 |
| 30 | Reserved | | 2 |
| 31 | Reserved | | 3 |

| MCS Index | Modulation Order | TBS Index | Redundancy Version ($rv_{idx}$) |
|---|---|---|---|
| 0 | 4 | 3 | 0 |
| 1 | 4 | 4 | 0 |
| 2 | 4 | 5 | 0 |
| 3 | 4 | 6 | 0 |
| 4 | 4 | 7 | 0 |
| 5 | 4 | 8 | 0 |
| 6 | 4 | 9 | 0 |
| 7 | 4 | 10 | 0 |
| 8 | 4 | 11 | 0 |
| 9 | 4 | 12 | 0 |
| 10 | 4 | 13 | 0 |
| 11 | 6 | 14 | 0 |
| 12 | 6 | 15 | 0 |
| 13 | 6 | 16 | 0 |
| 14 | 6 | 17 | 0 |
| 15 | 6 | 18 | 0 |
| 16 | 6 | 19 | 0 |
| 17 | 6 | 21 | 0 |
| 18 | 8 | 22 | 0 |
| 19 | 8 | 23 | 0 |
| 20 | 8 | 24 | 0 |
| 21 | 8 | 25 | 0 |
| 22 | 8 | 26 | 0 |
| 23 | 8 | 27 | 0 |
| 24 | 8 | 28 | 0 |
| 25 | 8 | 29 | 0 |
| 26 | 8 | 30 | 0 |
| 27 | 8 | 31 | 0 |
| 28 | 8 | 32 | 0 |
| 29 | Reserved | | 1 |
| 30 | Reserved | | 2 |
| 31 | Reserved | | 3 |

MODULATION CODING SCHEME (MCS) INDICATION IN LTE UPLINK

CROSS REFERENCES

The present Application for Patent is a Continuation of U.S. patent application Ser. No. 14/617,888 by Chen, et al., entitled "Modulation Coding Scheme (MCS) Indication in LTE Uplink" filed Feb. 9, 2015 and claims the benefit of U.S. Provisional Patent Application No. 61/984,701 by Chen et al., entitled "Modulation Coding Scheme (MCS) Indication in LTE Uplink," filed Apr. 25, 2014, assigned to the assignee hereof.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. A base station may grant a mobile device resources for upstream transmissions. The base station and mobile device may access a modulation coding scheme (MCS) table to determine the MCS to use for uplink transmission. As wireless communication systems increase their support of additional MCSs, existing MCS tables may not include data entries that account for these additional MCSs that are supported by the communication system. Therefore, additional MCS tables may be developed, and wireless communication systems may require methods for referencing the multiple MCS tables. In particular, a mobile device participating in upstream communications utilizing such additional MCSs may benefit from methods of indicating corresponding MCS tables to the mobile device.

SUMMARY

The described features generally relate to methods, systems, or apparatuses for indicating MCS to a user equipment (UE) for uplink transmissions in long term evolution (LTE). Generally, the UE may receive downlink control information (DCI) via a physical downlink control channel (PDCCH), for example. The DCI may have a particular DCI format, be configured to convey an MCS table reference, and include a grant of uplink (UL) resources for the UE. The UE may receive the DCI, determine the configuration of the DCI to extract the MCS table reference, and utilize the MCS table reference to identify an MCS table from a plurality of MCS tables to use for modulating and coding UL transmission on the UL grant resources. The UE may identify an MCS table associated with additional MCSs.

In a first set of illustrative examples, a method for wireless communications is described. The method may include: receiving, by a user equipment (UE), downlink control information (DCI) comprising an uplink (UL) grant of resources for the UE, the DCI having a DCI format and configured to convey a modulation coding scheme (MCS) table reference; identifying an MCS table from a plurality of MCS tables based on the MCS table reference conveyed in the DCI, wherein the MCS table defines modulation and coding to be utilized for UL transmissions on the resources granted in the UL grant; and sending one or more UL transmissions modulated and coded according to the MCS table.

In some aspects, the plurality of MCS tables may include at least a legacy MCS table associated with quadrature amplitude modulation up to a first modulation order and a non-legacy MCS table associated quadrature amplitude modulation up to a second order, wherein the second order is higher than the first order. The DCI may convey the MCS table reference based on a search space of a physical downlink control channel (PDCCH) the DCI is communicated in. The method may include determining whether the DCI is included in a common search space of the PDCCH frame or a UE-specific search space of the PDCCH frame. The method may include selecting a first MCS table based on the DCI being included in the common search space of the PDCCH frame and selecting a second MCS table based on the DCI being included in the UE-specific search space of the PDCCH frame.

In some aspects, the method may include receiving a configuration of two or more enhanced PDCCH (EPDCCH) resource sets, and selecting a first MCS table based on the DCI being communicated in a first EPDCCH resource set and selecting a second MCS table based on the DCI being communicated in the second EPDCCH resource set.

In some aspects, the DCI may convey the MCS table reference based on a type of a control channel the DCI is communicated on. The method may include selecting a first MCS table based on the DCI being communicated on a PDCCH frame and selecting a second MCS table based on the DCI being communicated on an EPDCCH frame. The DCI may convey the MCS table reference based on a masking code used to mask the DCI. The method may include the DCI masked with a first masking code is associated with a first MCS table, and the DCI masked with a second masking code is associated with a second MCS table.

In some aspects, identifying the MCS table may include identifying an MCS table index, and determining an entry of a first MCS table or a second MCS table based on the MCS table index, wherein the first MCS table and the second MCS table share one or more common entries. Identifying the MCS table may include identifying one or more bits in the DCI, and selecting an MCS table from the plurality of MCS tables based on the identified one or more bits. The method may include determining a power offset parameter associated with the identified MCS table, wherein a first power offset parameter is associated with a first MCS table and a second power offset parameter is associated with a second MCS table. The method may include determining a transmit power for at least one of the one or more UL transmissions based on the power offset parameter.

In a second illustrative set of examples, an apparatus for wireless communications is described. The apparatus may include a processor, memory in electronic communication with the processor, and instructions being executable by the processor. The instructions may be executable to: receive, by a user equipment (UE), downlink control information (DCI) comprising an uplink (UL) grant of resources for the UE, the DCI having a DCI format and configured to convey a modulation coding scheme (MCS) table reference; identify an MCS table from a plurality of MCS tables based on the MCS table reference conveyed in the DCI, wherein the MCS table defines modulation and coding to be utilized for UL transmissions on the resources granted in the UL grant; and send one or more UL transmissions modulated and coded according to the MCS table.

In some aspects, the plurality of MCS tables may include one or more of at least a legacy MCS table associated with quadrature amplitude modulation up to a first order and a non-legacy MCS table associated with quadrature amplitude modulation up to a second order, wherein the second order is higher than the first order. The DCI may convey the MCS table reference based on a search space of a physical downlink control channel (PDCCH) the DCI is communicated in. The instructions may be further executable to determine whether the DCI is included in a common search space of the PDCCH frame or a UE-specific search space of the PDCCH frame. The instructions may be executable to select a first MCS table based on the DCI being included in the common search space of the PDCCH frame and selecting a second MCS table based on the DCI being included in the UE-specific search space of the PDCCH frame.

In some aspects, the DCI may convey the MCS table reference based on which subframe of a physical downlink control channel (PDCCH) the DCI is communicated in. The instructions may be executable to select a first MCS table based on the DCI being included in a first subframe of the PDCCH frame and selecting a second MCS table based on the DCI being included in the second subframe of the PDCCH frame. The DCI format may be one or more of a DCI format 0 or a DCI format 4.

In some aspects, the instructions may be executable to receive a configuration of two or more EPDCCH resource sets, and select a first MCS table based on the DCI being communicated in a first EPDCCH resource set and selecting a second MCS table based on the DCI being communicated in the second EPDCCH resource set.

In some aspects, the instructions executable to identify the MCS table may be executable to identify an MCS table index, and determine an entry of a first MCS table or a second MCS table based on the MCS table index, wherein the first MCS table and the second MCS table share one or more common entries. The instructions to identify the MCS table may be executable to identify one or more bits in the DCI, and select an MCS table from the plurality of MCS tables based on the identified one or more bits. The apparatus may include instructions executable to determine a power offset parameter associated with the identified MCS table, wherein a first power offset parameter is associated with a first MCS table and a second power offset parameter is associated with a second MCS table. The apparatus may include instructions executable to determine a transmit power for at least one of the one or more UL transmissions based on the power offset parameter.

In some aspects, the apparatus may include instructions executable to determine an uplink control information (UCI) offset parameter associated with the identified MCS table, wherein a first UCI offset parameter is associated with a first MCS table associated and a second UCI offset parameter is associated with a second MCS table. The apparatus may include instructions executable to determine a number of resource elements for multiplexing the UCI with at least one of the one or more UL transmissions based on the UCI offset parameter. The UCI may include at least one of a hybrid automatic request repeat acknowledgement (HARQ-ACK), a rank indicator (RI), or a channel quality indicator (CQI).

In some aspects, the identified MCS table may a non-legacy MCS table associated with up to 256 quadrature amplitude modulation and the instructions may be executable to receive an indication of up to a 256 quadrature amplitude modulation for downlink (DL) transmissions, the DL transmission indication being separate from the DCI.

In a third set of illustrative examples, an apparatus for wireless communications is described. The apparatus may include: means for receiving, by a user equipment (UE), downlink control information (DCI) comprising an uplink (UL) grant of resources for the UE, the DCI having a DCI format and configured to convey a modulation coding scheme (MCS) table reference; means for identifying an MCS table from a plurality of MCS tables based on the MCS table reference conveyed in the DCI, wherein the MCS table defines modulation and coding to be utilized for UL transmissions on the resources granted in the UL grant; and means for sending one or more UL transmissions modulated and coded according to the MCS table.

In some aspects, the plurality of MCS tables may include at least a legacy MCS table associated with quadrature amplitude modulation up to a first order and a non-legacy MCS table being associated with quadrature amplitude modulation up to a second order, wherein the second order is higher than the first order. The DCI may convey the MCS table reference based on a search space of a physical downlink control channel (PDCCH) the DCI is communicated in. The apparatus may include means for determining whether the DCI is included in a common search space of the PDCCH frame or a UE-specific search space of the PDCCH frame. The apparatus may include means for selecting a first MCS table based on the DCI being included in the common search space of the PDCCH frame and selecting a second MCS table based on the DCI being included in the UE-specific search space of the PDCCH frame. The DCI format may be one or more of a DCI format 0 or a DCI format 4.

In some aspects, the DCI may convey the MCS table reference based on a type of a control channel the DCI is communicated on. The apparatus may include means for selecting a first MCS table based on the DCI being communicated on a PDCCH frame and selecting a second MCS table based on the DCI being communicated on an EPDCCH frame.

In some aspects, the apparatus may include means for receiving a configuration of two or more EPDCCH resource sets, and means for selecting a first MCS table based on the DCI being communicated in a first EPDCCH resource set and selecting a second MCS table based on the DCI being communicated in the second EPDCCH resource set.

In some aspects, the means for identifying the MCS table may include means for identifying an MCS table index, and means for determining an entry of a first MCS table or a second MCS table based on the MCS table index, wherein the first MCS table and the second MCS table share one or more common entries. The means for identifying the MCS table may include means for identifying one or more bits in the DCI, and means for selecting an MCS table from the plurality of MCS tables based on the identified one or more bits.

In some aspects, the apparatus may include means for determining a power offset parameter associated with the identified MCS table, wherein a first power offset parameter may be associated with a first MCS table and a second power offset parameter may be associated with a second MCS table. The apparatus may include means for determining a transmit power for at least one of the one or more UL transmissions based on the power offset parameter. The apparatus may include means for determining an uplink control information (UCI) offset parameter associated with the identified MCS table, wherein a first UCI offset parameter may be associated with a first MCS table associated and a second UCI offset parameter may be associated with a second MCS table.

In a fourth set of illustrative examples, a non-transitory computer-readable medium for wireless communications stores instructions executable by a processor to: receive, by a user equipment (UE), downlink control information (DCI) comprising an uplink (UL) grant of resources for the UE, the DCI having a DCI format and configured to convey a modulation coding scheme (MCS) table reference; identify an MCS table from a plurality of MCS tables based on the MCS table reference conveyed in the DCI, wherein the MCS table defines modulation and coding to be utilized for UL transmissions on the resources granted in the UL grant; and send one or more UL transmissions modulated and coded according to the MCS table.

In some aspects, the plurality of MCS tables may include at least a legacy MCS table associated with quadrature amplitude modulation up to a first order and a non-legacy MCS table associated with quadrature amplitude modulation up to a second order, wherein the second order is higher than the first order. The DCI may convey the MCS table reference based on a search space of a physical downlink control channel (PDCCH) the DCI is communicated in. The instructions may be executable to determine whether the DCI is included in a common search space of the PDCCH frame or a UE-specific search space of the PDCCH frame. The non-transitory computer-readable medium may include instructions executable to select a first MCS table based on the DCI being included in the common search space of the PDCCH frame and selecting a second MCS table based on the DCI being included in the UE-specific search space of the PDCCH frame.

In some aspects, the DCI may convey the MCS table reference based on which subframe of a physical downlink control channel (PDCCH) the DCI is communicated in. The non-transitory computer-readable medium may include instructions executable to select a first MCS table based on the DCI being included in a first subframe of the PDCCH frame and selecting a second MCS table based on the DCI being included in the second subframe of the PDCCH frame. The DCI format may be one or more of a DCI format 0 or a DCI format 4.

In some aspects, the DCI may convey the MCS table reference based on a type of a control channel the DCI is communicated on. The non-transitory computer-readable medium may include instructions executable to select a first MCS table based on the DCI being communicated on a PDCCH frame and selecting a second MCS table based on the DCI being communicated on an EPDCCH frame. The DCI may convey the MCS table reference based on a masking code used to mask the DCI. The DCI masked with a first masking code may be associated with a first MCS table, and the DCI masked with a second masking code may be associated with a second MCS table. The instructions executable to identify the MCS table may be executable to identify an MCS table index, and determine an entry of a first MCS table or a second MCS table based on the MCS table index, wherein the first MCS table and the second MCS table share one or more common entries.

In some aspects, the instructions to identify the MCS table may be executable to identify one or more bits in the DCI, and select an MCS table from the plurality of MCS tables based on the identified one or more bits. The non-transitory computer-readable medium may include instructions executable to determine a power offset parameter associated with the identified MCS table, wherein a first power offset parameter is associated with a first MCS table and a second power offset parameter is associated with a second MCS table. The non-transitory computer-readable medium may include instructions executable to determine a transmit power for at least one of the one or more UL transmissions based on the power offset parameter.

In some aspects, the non-transitory computer-readable medium may include instructions executable to receive a configuration of two or more EPDCCH resource sets, and select a first MCS table based on the DCI being communicated in a first EPDCCH resource set and selecting a second MCS table based on the DCI being communicated in the second EPDCCH resource set.

In some aspects, the non-transitory computer-readable medium may include instructions executable to determine an uplink control information (UCI) offset parameter associated with the identified MCS table, wherein a first UCI offset parameter is associated with a first MCS table associated and a second UCI offset parameter is associated with a second MCS table. The non-transitory computer-readable medium may include instructions executable to determine a number of resource elements for multiplexing the UCI with at least one of the one or more UL transmissions based on the UCI offset parameter. The UCI may include at least one of a hybrid automatic request repeat acknowledgement (HARQ-ACK), a rank indicator (RI), or a channel quality indicator (CQI). The identified MCS table may be a non-legacy MCS table associated with up to 256 quadrature amplitude modulation and the instructions may be executable to receive an indication of up to a 256 quadrature amplitude modulation for downlink (DL) transmissions, the DL transmission indication being separate from the DCI.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 shows an example downlink CQI table according to various aspects of the present disclosure.

FIGS. 5A and 5B show example uplink MCS tables according to various aspects of the present disclosure.

DETAILED DESCRIPTION

Figure 1:
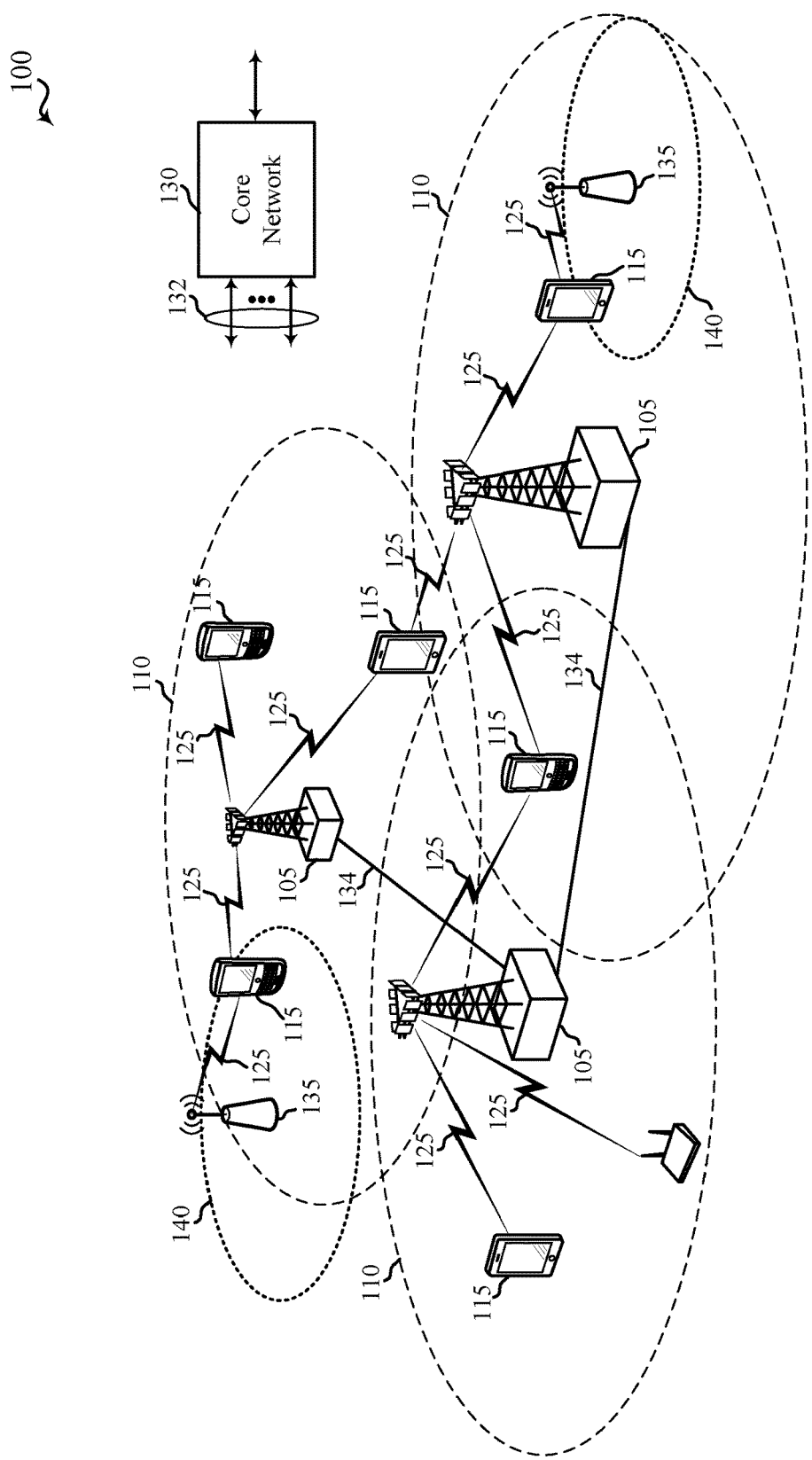
FIG. 1 shows a diagram of a wireless communication system according to various aspects of the present disclosure.

Wireless communication standards may support various modulation coding schemes (MCSs) for downlink and uplink transmissions. In one configuration, Quadrature Phase Shift Keying (QPSK), 16 quadrature amplitude modulation (16 QAM), and 64 QAM may be examples of legacy modulation coding schemes supported by a wireless communication standard. In addition, a wireless communication standard may support non-legacy MCSs up to, for example, at least 256 QAM. As an example, wireless communication standards may provide for the use of multiple MCSs for downlink transmissions, and may even include fallback operations to ensure that supported configurations for 256 QAM are covered. To do so, an evolved Node B (eNB) in a wireless communication system may select an appropriate MCS table to use for downlink transmissions on a wireless channel. For uplink transmissions, however, separate MCSs may be used. Thus, a separate indication to a user equipment (UE) indicating which MCS table to reference may be beneficial. Accordingly, a wireless communication system may enable MCS indication methods in long term evolution (LTE) for uplink transmissions. In this or other examples, MCSs associated with higher order modulations or greater complexity modulations may be used (e.g., 1024 QAM).

The described techniques and apparatuses indicate MCS tables to a UE for the UE to use for modulating and coding uplink transmissions. The UE may receive downlink control information (DCI) that is configured to convey and indicate which of a plurality of MCS tables the UE is to utilize for resources provided in an uplink grant. The UE may determine the configuration of the DCI to identify the appropriate MCS table to use and send uplink transmission modulated and coded based on the identified MCS table. The configuration of the DCI to convey the reference to the appropriate MCS table may take a variety of forms, (e.g., the DCI format, which search space the DCI is communicated in, one or more bits in the DCI, which subframe the DCI is located in, the type of control channel conveying the DCI, a resource set index associated with enhanced physical downlink control channel (EPDCCH) if a UE is configured with two or more EPDCCH resource sets, a virtual cell ID associated with physical uplink shared channel (PUSCH), etc.). In some examples, the DCI may be configured to reference a legacy MCS table supporting MCS schemes up to 64 QAM. In other examples, the DCI may be configured to reference a non-legacy MCS table supporting MCS schemes up to at least 256 QAM. Accordingly, the eNB may send the appropriately configured DCI to the UE to indicate whether 256 QAM is supported while conserving control overhead resources.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communication system 100. The wireless communication system 100 includes base stations (or cells or nodes) 105, user equipments (UEs) 115, and a core network 130. For the purposes of the present disclosure, the terms "cell," "base station," and "eNB" are used interchangeably. For the purposes of the present disclosure, the terms "UE" and "mobile device" are used interchangeably.

The base stations 105 may communicate with the UEs 115 under the control of a base station controller (not shown), which may be part of the core network 130 or the base stations 105 in various examples. Base stations 105 may communicate control information or user data with the core network 130 through backhaul 132. In certain examples, the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective geographic coverage area 110. In some examples, a base station 105 may be referred to as a base transceiver station, a radio base station, an access point, a radio transceiver, a basic service set (BSS), an extended service set (ESS), a NodeB, eNodeB (eNB), a Home NodeB, a Home eNodeB, or some other suitable terminology. The coverage area 110 for a base station 105 may be divided into sectors making up only a portion of the coverage area (not shown). The wireless communication system 100 may include base stations 105 of different types (e.g., macro, micro, or femto/pico base stations). There may be overlapping coverage areas for different technologies.

In certain examples, the wireless communication system 100 is an LTE/LTE-A network. In LTE/LTE-A networks, the term evolved Node B (eNB) may be generally used to describe one or more of the base stations 105. The wireless communication system 100 may be a Heterogeneous LTE/LTE-A network in which different types of eNBs provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

In one example, an eNB 105 selects between various MCSs to use for a transmission to a UE 115. The selected MCS may be based at least in part on a channel quality indicator (CQI) value reported from the UE 115. The eNB 105 may select between various CQI tables to identify the table corresponding to the CQI value received from the UE 115. The eNB 105 may also select between various MCS tables to identify the table from which an MCS may be identified for a transmission on the downlink or a transmission on the uplink. The selected MCS table may be based at least in part on the CQI value received from the UE 115. The eNB may, in some examples, indicate a reference to a selected MCS table to the UE 115 to be utilized for uplink transmissions.

In another example, the mode-dependent DCI may be associated with the legacy MCS table or the new MCS table based on RRC configuration. Additionally, DCI format 1A scheduling PDSCH may be associated with the legacy MCS table if the DCI is communicated in a first EPDCCH resource set, or associated with the new MCS table if the DCI is communicated in a second EPDCCH resource set.

The EPDCCH resource set-dependent MCS table determination may be jointly or separately managed for DL and UL transmissions. As an example for joint management, both DCI format 0 and DCI format 1A may be associated with the legacy MCS table and the mode-dependent DCIs for both DL and UL scheduling (e.g., DCI format 2D and DCI format 4) may be associated with the legacy MCS table if the DCI is communicated in a first EPDCCH resource set. If the DCI is communicated in a second EPDCCH resource set, the mode-dependent DCIs for both DL and UL scheduling (e.g., DCI format 2D and DCI format 4) may be associated with the new MCS table. As an example for separate management, DCI format 1A may be associated with the legacy MCS and DCI format 0 may be associated with the legacy MCS table if the DCI is communicated in a first EPDCCH resource set. If the DCI is communicated in a second EPDCCH resource set, DCI format 1A may be associated with the new MCS.

The core network 130 may communicate with the base stations 105 via a backhaul 132 (e.g., S1, etc.). The base stations 105 may also communicate with one another, directly or indirectly, via backhaul links 134 (e.g., X2, etc.) or via backhaul 132 (e.g., through core network 130). The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communications links 125 shown in the wireless communication system 100 may include uplink (UL) transmissions from a UE 115 to a base station 105, or downlink (DL) transmissions from a base station 105 to a UE 115. The downlink transmissions may also be called forward link transmissions while the uplink transmissions may also be called reverse link transmissions.

The UEs 115 are dispersed throughout the wireless communication system 100 and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like. In addition, the UE 115 may be able to select between various MCS tables to identify the MCS that the UE 115 may use for an uplink transmission.

A UE 115 may be configured to receive a DCI from a serving eNB 105 and determine the format for the DCI and the configuration of the DCI. Based on the determined format and configuration of the DCI, the UE 115 may identify an MCS table from among a set of MCS tables for uplink transmissions. The DCI may include a grant of uplink resources for the UE 115 (e.g., a grant of time frequency resources of a physical uplink shared channel (PUSCH)). The configuration of the DCI or the format for the DCI may be selected to convey a reference to the MCS table the UE 115 is to utilize for the uplink transmissions. For example, the DCI may have a DCI format 0 or a DCI format 4, which indicates, at least to some degree, to the UE 115 which MCS table to select. Aspects of the DCI may also be configured to further indicate the MCS table for the UE 115 to select for the uplink transmissions. Accordingly, the DCI format and configuration may indicate the MCS table for the UE 115 to use for uplink transmissions in an LTE environment supporting various MCS schemes.

Figure 2:
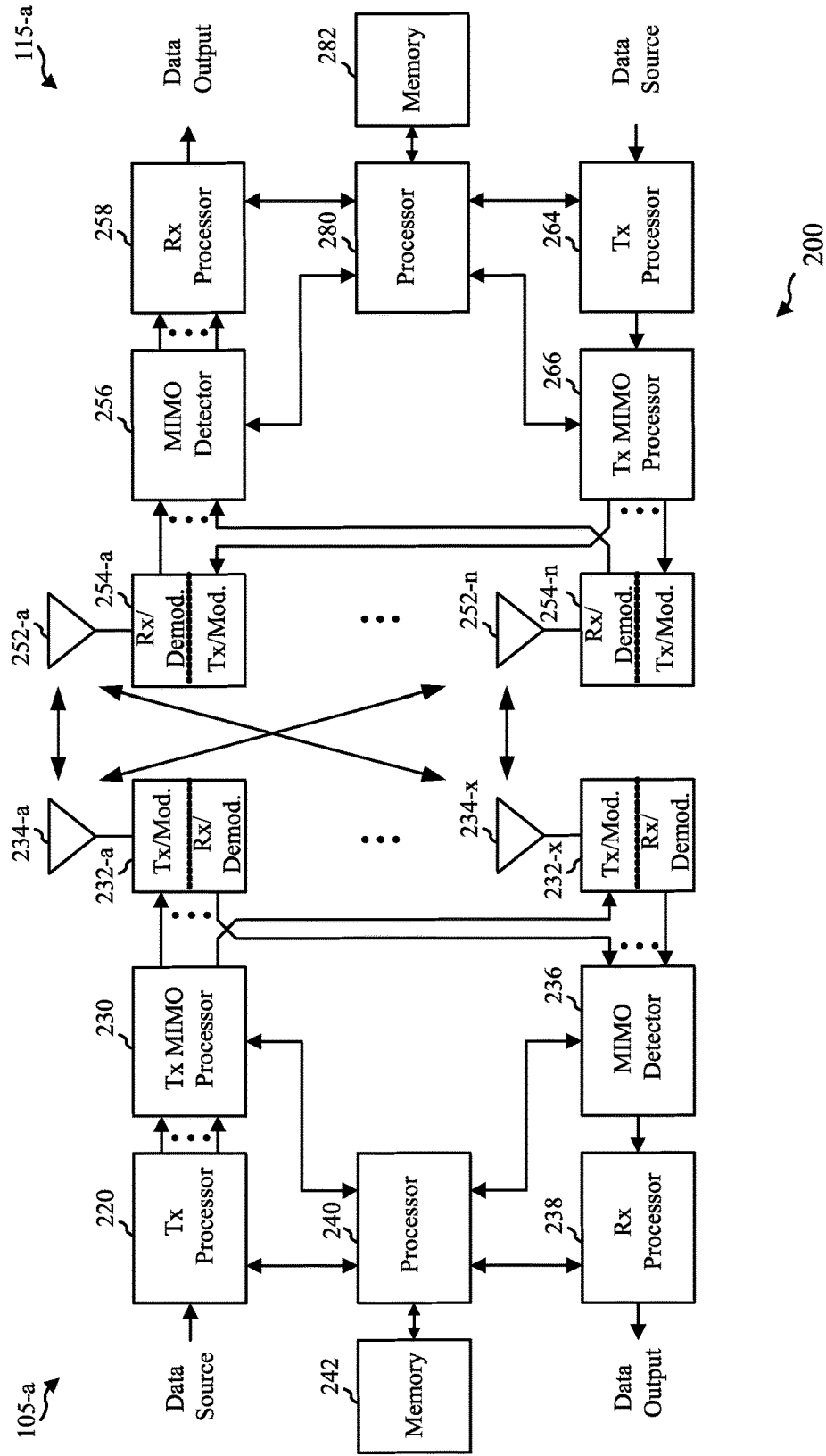
FIG. 2 shows a block diagram of a wireless communication system according to various aspects of the present disclosure.

FIG. 2 is a block diagram conceptually illustrating a design of a wireless communication system 200 including a base station 105-*a* and a UE 115-*a*. This wireless communication system 200 may illustrate aspects of the wireless communication system 100 of FIG. 1. For example, base station 105-*a* may be an example of one or more base stations 105 in FIG. 1. UE 115-*a* may be an example of one or more UEs 115 in FIG. 1. The base station 105-*a* may be equipped with antennas 234-*a* through 234-*x*, where x is a positive integer, and the UE 115-*a* may be equipped with antennas 252-*a* through 252-*n*, where n is a positive integer. In the wireless communication system 200, the base station 105-*a* may be able to send data over multiple communication links at the same time. Each communication link may be called a "layer" and the "rank" of the communication link may indicate the number of layers used for communication. For example, in a 2×2 multiple-input/multiple-output (MIMO) system where base station 105-*a* transmits two "layers," the rank of the communication link between the base station 105-*a* and the UE 115-*a* is two.

At the base station 105-*a*, a transmit processor 220 may receive data from a data source and control information from a controller/processor 240. The control information may be for the physical broadcast channel (PBCH), physical control format indicator channel (PCFICH), physical hybrid-ARQ indicator channel (PHICH), physical downlink control channel (PDCCH), etc. The transmit processor 220 may process the data (e.g., encode and symbol map) and control information to obtain data symbols and control symbols, respectively. The transmit processor 220 may also generate reference symbols and a cell-specific reference signal. A transmit (TX) MIMO processor 230 may perform spatial processing (e.g., precoding) on data symbols, control symbols, or reference symbols, if applicable, and may provide output symbol streams to the modulator/demodulators 232-*a* through 232-*x*. Each modulator/demodulator 232 may process a respective output symbol stream (e.g., for OFDM, etc.) to obtain an output sample stream. Each modulator/demodulator 232 may further process (e.g., convert to analog, amplify, filter, and upconvert) the output sample stream to obtain a downlink (DL) signal. In one example, DL signals from modulator/demodulators 232-*a* through 232-*x* may be transmitted via the antennas 234-*a* through 234-*x*, respectively.

At the UE 115-*a*, the UE antennas 252-*a* through 252-*n* may receive the DL signals from the base station 105-*a* and may provide the received signals to the modulator/demodulators 254-*a* through 254-*n*, respectively. Each modulator/demodulator 254 may condition (e.g., filter, amplify, downconvert, and digitize) a respective received signal to obtain input samples. Each modulator/demodulator 254 may further process the input samples (e.g., for OFDM, etc.) to obtain received symbols. A MIMO detector 256 may obtain received symbols from all the modulator/demodulators 254-*a* through 254-*n*, perform MIMO detection on the received symbols if applicable, and provide detected symbols. A receive processor 258 may process (e.g., demodulate, deinterleave, and decode) the detected symbols, providing decoded data for the UE 115-*a* to a data output, and provide decoded control information to a controller/processor 280, or memory 282.

On the uplink (UL), at the UE 115-*a*, a transmit processor 264 may receive and process data from a data source. The transmit processor 264 may also generate reference symbols for a reference signal. The symbols from the transmit processor 264 may be precoded by a transmit MIMO processor 266 if applicable, further processed by the modulator/demodulators 254-*a* through 254-*n* (e.g., for single carrier (SC)-FDMA, etc.), and be transmitted to the base station 105-*a* in accordance with the transmission parameters received from the base station 105-*a*. At the base station 105-*a*, the UL signals from the UE 115-*a* may be received by the antennas 234, processed by the modulator/demodulators 232, detected by a MIMO detector 236 if applicable, and further processed by a receive processor 238. The receive processor 238 may provide decoded data to a data output and to the controller/processor 240. The components of the UE 115-*a* may, individually or collectively, be implemented with one or more Application Specific Integrated Circuits (ASICs) adapted to perform some or all of the applicable functions in hardware. Each of the noted modules may be a means for performing one or more functions related to operation of the wireless communication system 200. Similarly, the components of the base station 105-*a* may, individually or collectively, be implemented with one or more ASICs adapted to perform some or all of the applicable functions in hardware. Each of the noted components may be a means for performing one or more functions related to operation of the wireless communication system 200.

In one configuration, the UE 115-*a* include means for receiving a reference to an MCS table to be used for uplink transmissions and sending the uplink transmissions modulated and coded based on the selected MCS table. The UE 115-*a* may also include means for receiving a DCI that includes an uplink grant of resources. The UE 115-*a* may, for example, include means for determining a configuration of the DCI as well as the format for the DCI. The UE 115-*a* may, for example, include means for identifying an MCS table from a plurality of MCS tables based on the configuration and format for the DCI. The UE 115-*a* may, in another example, include means for sending uplink transmissions that are modulated and coded according to the identified MCS table. In one aspect, the aforementioned means may be the controller/processor 280, the memory 282, the transmit processor 264, receive processor 258, the modulator/demodulators 254, and the antennas 252 of the UE 115-*a* configured to perform the functions recited above and described in greater detail below.

In one configuration, the eNB 105-*a* includes means for configuring DCI to have a DCI format and to convey an MCS table reference. In some cases, the DCI format may be predefined. The eNB 105-*a* may also include means for sending, to the UE 115-*a*, the DCI, the DCI comprising an uplink grant of resources for the UE 115-*a*. The eNB 105-*a* may, for example, include means for receiving, from the UE 115-*a*, one or more uplink transmissions modulated and coded according to an MCS table from a plurality of MCS tables, the MCS table identified based on the MCS table reference conveyed in the DCI. In one aspect, the aforementioned means may be the controller/processor 240, the memory 242, the transmit processor 224, receive processor 238, the modulator/demodulators 232, and the antennas 234 of the eNB 105-*a* configured to perform the functions recited above and described in greater detail below.

Figure 3:
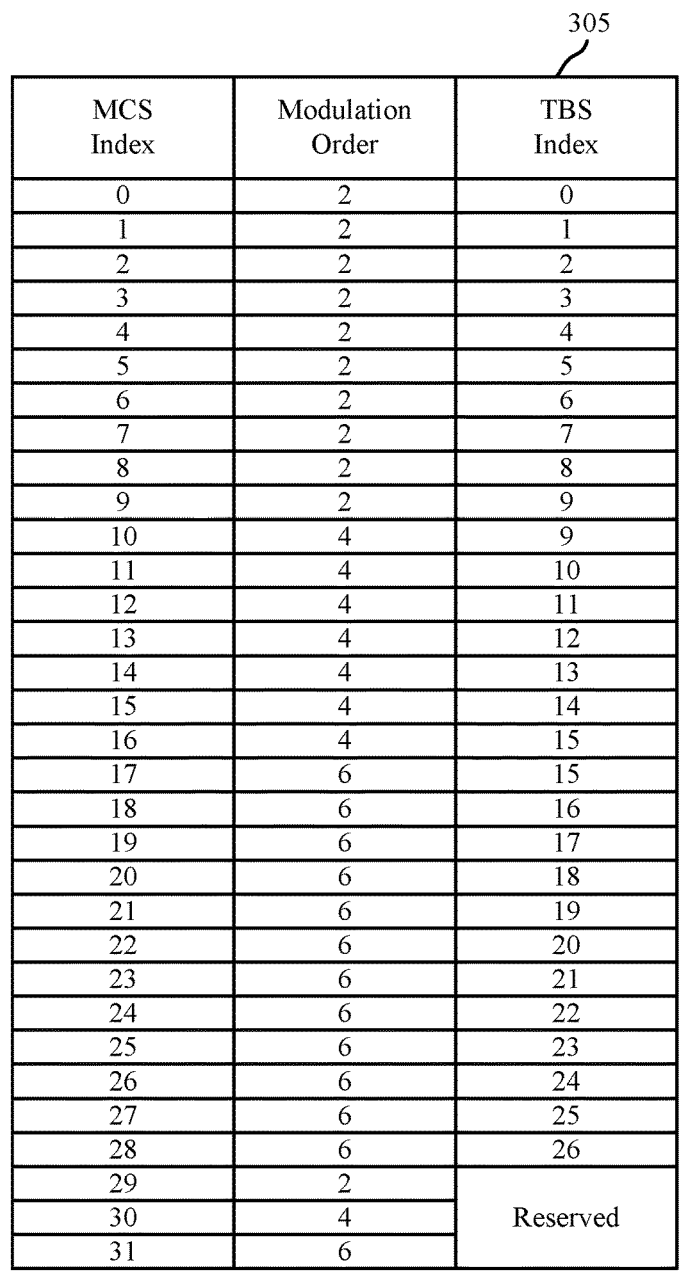
FIG. 3 shows an example downlink MCS table according to various aspects of the present disclosure.

FIG. 3 shows diagram 300 of an example downlink MCS table 305, according to various aspects of the present disclosure. The downlink MCS table 305 may be an example of a downlink MCS table used for downlink transmissions between a UE 115 and an eNB 105 of FIG. 1 or 2. Downlink MCS table 305 may utilize five bits to represent up to 32 MCSs to choose from for downlink transmissions. The MCS table 305 may include transport block size lookup indices as well as the modulation order to be used for corresponding MCSs. The MCS table 305 may be based on a five-bit MCS and may include a list of MCS indices from 0 to 31. Each index may correspond to at least one modulation scheme to be used for a transmission. In some examples, the MCS indices 0-28 may indicate MCS schemes for new transmissions or retransmissions, whereas indices 29-31 may provide MCS schemes for retransmissions. In addition, each MCS index may be mapped to at least one transport block size (TBS) look-up index. The TBS look-up index may indicate a size of a transport block to be transmitted using the corresponding MCS. The mapping between MCS index and TBS index may not be a one-to-one corresponding mapping, (e.g., MCS indices 9 and 10 both map to TBS index 9). In the MCS table 305, the modulation order may support modulation of up to 64 QAM (i.e., modulation order 6). According to various wireless communication standards, downlink MCS tables that support up to 256 QAM may also be provided.

FIG. 4 shows a diagram 400 of an example CQI reporting table 405, according to various aspects of the present disclosure. The CQI reporting table 405 may be received by an eNB 105 from a UE 115 (of FIG. 1 or 2) and used to identify a CQI value for a wireless channel. The CQI value may then be used to select a particular MCS to use for a transmission on the wireless channel. The CQI reporting table 405 may represent a CQI value using four bits. A CQI table may include a listing of CQI indices corresponding to the 16 possible CQI values (if four bits are used to represent the CQI value). Each CQI index value may be mapped to additional data that can be used to select an MCS.

In LTE Release 12, 256 QAM is supported for downlink operations. Therefore, Release 12 defines new CQI tables to support channel state information (CSI) feedback with 256 QAM entries. Release 12 also defines new MCS tables to support scheduling of PDSCH with 256 QAM. Additionally, new TBS tables are also defined such that larger TBS (hence higher peak rate) can be supported. The support of 256 QAM for downlink operations may be motivated by small cell deployment where a UE may experience favorable channel conditions.

However, downlink channel/interference conditions experienced by a UE may be quite different from uplink channel/interference conditions for the UE. For downlink 256 QAM support, it is reasonable to associate the compact DCI format 1A with the legacy MCS table and to rely on the downlink-transmission-mode dependent DCI to indicate downlink 256 QAM operation. This is because if a physical downlink shared channel (PDSCH) supports 256 QAM, it is reasonable to assume that downlink channel conditions are favorable enough that DCI overhead is not a significant concern. As a result, it may be reasonable to not have DCI format 1A associated with 256 QAM. Instead, DCI format 1A may be associated with legacy MCS table to be used for fallback operations (i.e., to account for potential ambiguity during 256 QAM reconfiguration). However, if 256 QAM is enabled for uplink, there is no guarantee that downlink channel/interference conditions are favorable to the extent that control channel overhead is still not a concern.

FIGS. 5A and 5b show diagrams 500-a and 500-b of example uplink MCS tables 505 and 510, respectively. The uplink MCS tables 505 and 510 may be examples of multiple MCS tables described according to various aspects of the present disclosure. A UE 115 (of FIG. 1 or 2) may identify one of the MCS tables to determine modulation and coding for uplink transmissions in accordance with various aspects. The identification of the MCS table by the UE 115 may be facilitated by an indicator received from an eNB 105 (of FIG. 1 or 2).

In some examples, uplink MCS table 505 may be an example of a legacy MCS table which utilizes five bits to represent up to 32 MCSs to choose from for uplink transmissions. The uplink MCS table 505 may include transport block size lookup indices as well as the modulation order to be used for corresponding MCSs. The mapping between MCS index and TBS index may not be a one-to-one corresponding mapping (e.g., MCS indices 9 and 10 both map to TBS index 9). In the uplink MCS table 505, the modulation order may support modulation of up to 64 QAM (i.e., modulation order 6). In some examples, the modulation order may be greater than 64 QAM.

The uplink MCS table 510 may be an example of a non-legacy MCS table that supports higher order modulation (e.g., modulation order 8 supporting 256 QAM). Uplink MCS table 510 may also utilize 5 bits to represent up to 32 MCSs to choose from for uplink transmissions. At least a portion of uplink MCS table 510 may overlap with at least a portion of uplink MCS table 505 for lower order modulation or TBS indices. The uplink MCS table 510 may be used to support 256 QAM through higher order modulation (e.g., modulation order 8). The MCS tables 505 and 510 may further include redundancy versions associated with retransmissions where each subsequent retransmission reduces the effective code rate through incremental redundancy.

Figure 6:
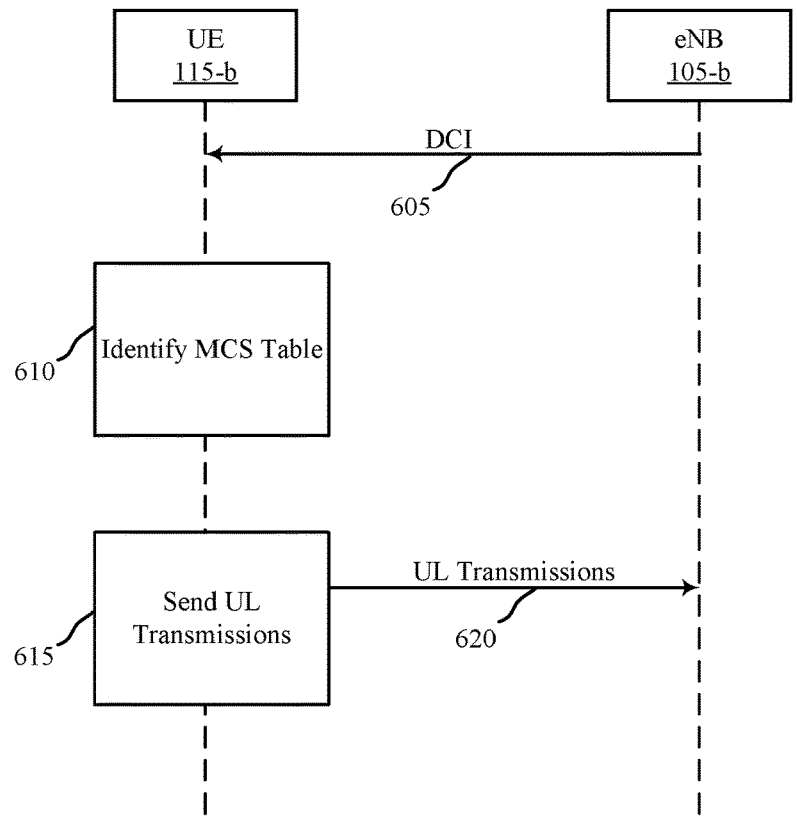
FIG. 6 shows a flow diagram for indicating MCS according to various aspects of the present disclosure.

FIG. 6 shows a diagram 600 conceptually illustrating an example of communications between a UE 115-b and an eNB 105-b, in accordance with aspects of the present disclosure. The UE 115-b may be an example of the UEs 115 described with respect to FIG. 1 or 2. The eNB 105-b may be an example of the base stations 105 described with respect to FIG. 1 or 2. Generally, FIG. 6 illustrates a process for indicating uplink MCS to the UE 115-b.

At 605, the eNB 105-b may send DCI to the UE 115-b. The eNB 105-b may select a format for the DCI and configure the DCI to convey a reference to an MCS table for uplink transmissions. In some cases, the DCI format may be predefined. The DCI may include an uplink grant of resources for the UE 115-b to use for uplink transmissions. The DCI may be communicated to the UE 115-b via one or more subframes of a frame on a PDCCH channel. In some examples, the eNB 105-b may select a DCI format 0 or a DCI format 4 for the DCI to indicate that the DCI is configured, at least in some aspects, to support higher order modulation. In other aspects, the eNB 105-b may select a DCI format 0 for the DCI (i.e., the DCI format 0 may be associated with a legacy uplink MCS table and a non-legacy uplink MCS table). Additionally or alternatively, the eNB 105-b may configure the DCI to convey a reference to an MCS table for the UE 115-b. For example, the eNB 105-b may configure the DCI by selecting a search space of a frame of a PDCCH to convey the reference, selecting one or more bits in the DCI to convey the reference, selecting a subframe of a frame of a PDCCH to convey the reference, selecting a type of control channel (e.g., enhanced (E)-PDCCH v. PDCCH) to convey the reference, selecting a resource set index associated with EPDCCH if a UE is configured with two or more EPDCCH resource sets, selecting a virtual cell ID associated with PUSCH, selecting a particular masking code to mask the DCI to convey the reference, or combinations thereof. Accordingly, the DCI may have a predefined format and configuration to convey the reference to an uplink MCS table for the UE 115-b.

At 610, the UE 115-b may identify an uplink MCS table based on the DCI. In some examples, the UE 115-b may determine the format for the DCI as well as the configuration of the DCI (e.g., DCI format 0 or 4, common or UE-specific search space, etc.). Based on the format or the configuration of the DCI, the UE 115-b may identify and select an MCS table from multiple MCS tables for uplink transmissions. For example, the UE 115-b may select an MCS table associated with up to 64 QAM modulation and coding if the DCI is a first predefined format and configured according to a first configuration. In another example, the UE 115-b may select an MCS table associated with up to at least 256 QAM if the DCI is a second predefined format and configured according to a second configuration.

At 615, the UE 115-b may send one or more uplink transmissions 620 to the eNB 105-b. The uplink transmissions may be modulated and coded according to the identified uplink MCS table. The uplink transmissions may be modulated and coded utilizing up to at least 256 QAM, dependent upon the identified uplink MCS table.

Figure 7:
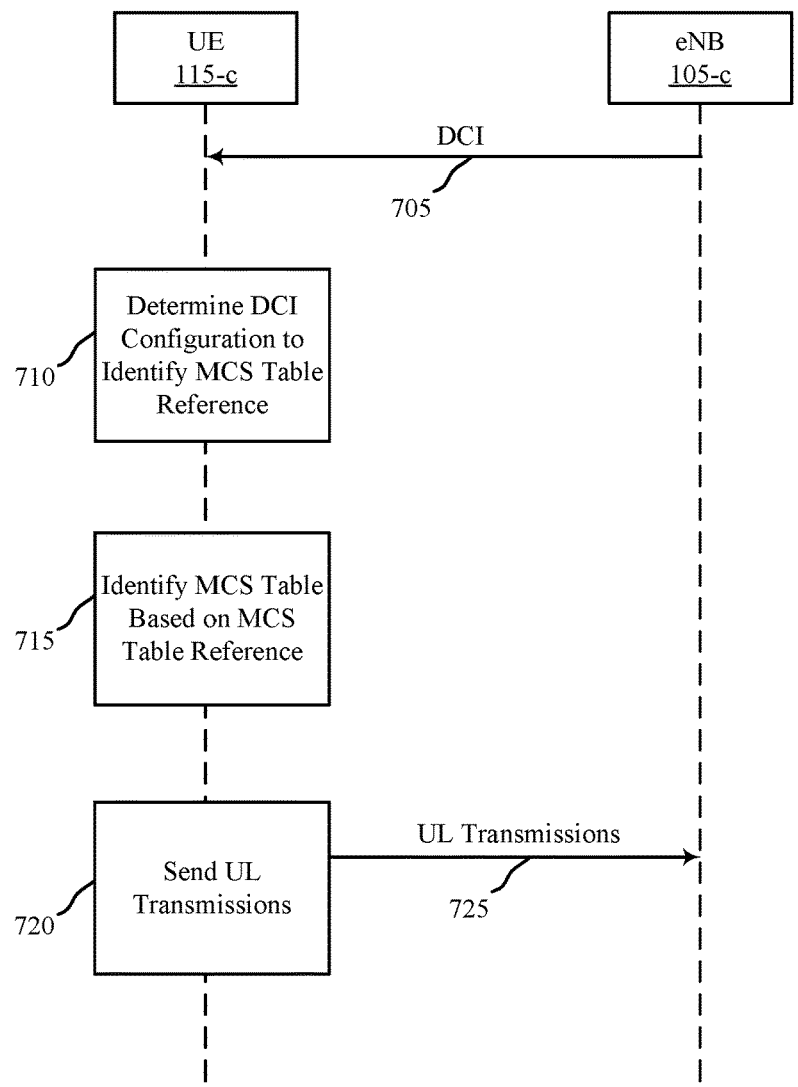
FIG. 7 shows another flow diagram for indicating MCS according to various aspects of the present disclosure.

FIG. 7 shows a diagram 700 conceptually illustrating an example of communications between a UE 115-*c* and an eNB 105-*c*, in accordance with an aspect of the present disclosure. The UE 115-*c* may be an example of the UEs 115 described with respect to FIG. 1, 2, or 6. The eNB 105-*c* may be an example of the base stations 105 described with respect to FIG. 1 or 2 or the eNB 105 described with respect to FIG. 6. Generally, FIG. 7 illustrates a process for indicating an uplink MCS reference table for uplink transmissions.

At 705, the eNB 105-*c* may send DCI to the UE 115-*c*. The eNB 105-*b* may select a format for the DCI and configure the DCI to convey a reference to an MCS table for uplink transmissions. In some cases, the DCI format may be predefined. The DCI may include an uplink grant of resources for the UE 115-*b* to use for uplink transmissions.

At 710, the UE 115-*c* may determine a configuration of the DCI to identify an MCS table reference. In some examples, the UE 115-*c* may determine whether the format of the DCI is a DCI format 0 or a DCI format 4 to determine the configuration of the DCI to identify the MCS table reference. Additionally or alternatively, the UE 115-*c* may determine whether the DCI is communicated in a common search space or a UE-specific search space to determine the configuration of the DCI to identify the MCS table reference. According to other aspects, the UE 115-*c* may determine the configuration of the DCI to identify the MCS table reference by determining which subframe of a frame of a PDCCH conveys the DCI, one or more bits in the DCI, which type of control channel (e.g., E-PDCCH v. PDCCH) conveys the DCI, a resource set index associated with EPDCCH if a UE is configured with two or more EPDCCH resource sets, a virtual cell ID associated with PUSCH, which masking code is used to mask the DCI, or combinations thereof. Accordingly, the UE 115-*c* may determine the configuration of the DCI to identify the MCS table reference. At 715, the UE 115-*c* may identify an uplink MCS table based on the MCS table reference. In some examples, the UE 115-*c* may identify and select an MCS table from multiple MCS tables for uplink transmissions. The UE 115-*c* may identify the uplink MCS table based on the reference determined based on the DCI configuration. The UE 115-*c* may select an MCS table associated with up to 64 QAM modulation and coding if a first MCS table reference is identified via the DCI. In another example, the UE 115-*c* may select an MCS table associated with up to at least 256 QAM modulation and coding if a second MCS table reference is identified via the DCI.

At 720, the UE 115-*c* may send one or more uplink transmissions 725 to the eNB 105-*c*. The uplink transmissions may be modulated and coded according to the identified uplink MCS table. The uplink transmissions may be modulated and coded utilizing up to at least 256 QAM, dependent upon the identified uplink MCS table.

Figure 8:
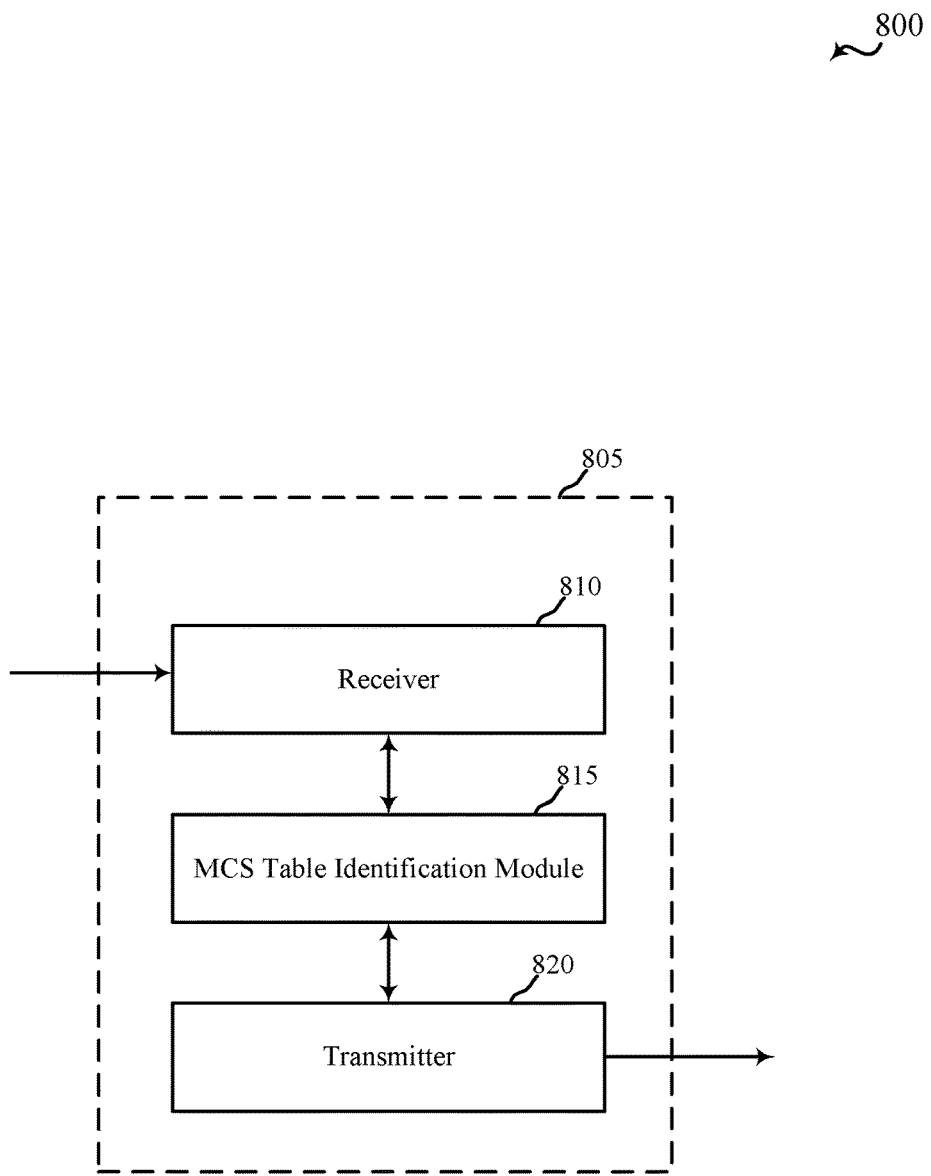
FIG. 8 shows a block diagram of a device according to various aspects of the present disclosure.

FIG. 8 shows a block diagram 800 of a device 805 according to various examples. In some examples, the device 805 may illustrate aspects of one of the UEs 115 of FIG. 1, 2, 6, or 7. The device 805 may include a receiver 810, an MCS table identification module 815, and a transmitter 820. Each of these components may be in communication with each other, either directly or indirectly.

The receiver 810 may receive information such as packets, user data, or control information associated with various information channels (e.g., control channels, data channels, etc.). The receiver 810 may be configured to operate using a single antenna, or it may be configured to employ receive diversity techniques using a plurality of antennas (not shown). The receiver 810 may receive the various information channels over a primary carrier associated with a primary cell (e.g., a serving eNB 105) and one or more secondary carriers associated with secondary cells. Information may be passed on to and from the MCS table identification module 815, the transmitter 820, and to other components of the device 805.

The transmitter 820 may transmit one or more signals received from other components of the device 805. The transmitter 820 may transmit information over a primary carrier associated with a primary cell and one or more secondary carriers associated with secondary cells. In some examples, the transmitter 820 may be collocated with the receiver 810 in a transceiver. The transmitter 820 may be configured to operate using a single antenna, or it may be configured to employ transmit diversity techniques using a plurality of antennas (not shown).

The MCS table identification module 815 may manage identification of an MCS table, from among a plurality of MCS tables, for uplink transmissions. In some examples, the device 805 may receive DCI from a serving eNB 105 via receiver 810 and MCS table identification module 815 may be configured to analyze the DCI to extrapolate an MCS table reference. The MCS table reference may point to one of the MCS tables to be utilized for uplink transmissions. The MCS table identification module 815 may analyze the DCI to determine the MCS table reference by determining a format for the DCI and a configuration of the DCI. The DCI format and the configuration of the DCI may point to a legacy MCS table for uplink transmissions using lower order modulation (e.g., modulation order 6 for 64 QAM) or may point to a non-legacy MCS table for uplink transmissions using higher order modulation (e.g., modulation order 8 for 256 QAM). The MCS table identification module 815 may, alone or in combination with transmitter 820, modulate and code information for uplink transmissions to be sent to the serving eNB 105 or other eNBs.

Alternatively or additionally, the non-legacy MCS table can be designed such that it shares a common set of entries with the legacy MCS table. As an example, a set of MCS indices {k1, k2, . . . , kn} in the non-legacy MCS table have the same definition as the set of MCS indices {k1, k2, . . . , kn} in the legacy MCS table. The set of MCS indices may not be contiguous indices. As an example, the set of MCS indices may be {2, 4, 6, 8, 10, 12, 14, 15, 16, 17, . . . , 31}, where each of the MCS indices has the same definition in the legacy MCS table and the non-legacy MCS table. For instance, an MCS index 2 in both the legacy MCS table the non-legacy MCS table is defined to map to QPSK (modulation order 2), TBS index 2, and redundancy version 0. With this arrangement, fallback operation can be supported. That is, an eNB can use an MCS index in the set of MCS indices to communicate with the UE without any ambiguity during radio resource control (RRC) re-configuration.

Figure 9:
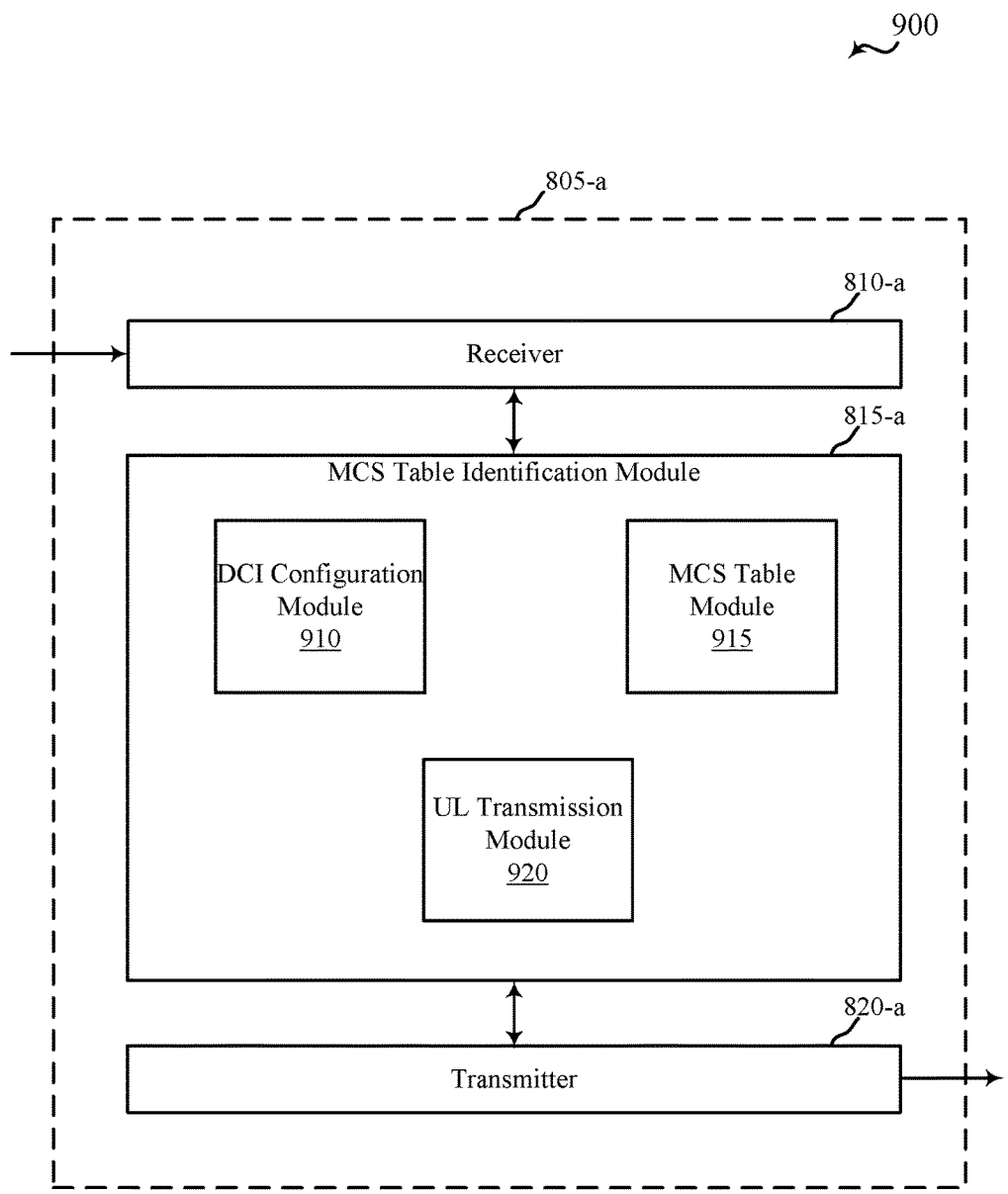
FIG. 9 shows a block diagram of another device according to various aspects of the present disclosure.

FIG. 9 shows a block diagram 900 of a device 805-*a* according to various examples. In some examples, the device 805-*a* may illustrate aspects of one of the UEs 115 of FIG. 1, 2, 6, or 7, or the device 805 of FIG. 8. The device 805-*a* may include a receiver 810-*a*, an MCS table identification module 815-*a*, and a transmitter 820-*a*. Each of these components may be in communication with each other, either directly or indirectly.

The receiver 810-*a* may receive information such as packets, user data, or control information associated with various information channels (e.g., control channels, data channels, etc.). The receiver 810-*a* may be configured to operate using a single antenna, or it may be configured to employ receive diversity techniques using a plurality of antennas (not shown). The receiver 810-*a* may receive the various information channels over a primary carrier associated with a primary cell (e.g., a serving eNB 105) and one or more secondary carriers associated with secondary cells. Information may be passed on to and from the MCS table identification module 815-*a*, the transmitter 820-*a*, and to other components of the device 805-*a*.

The transmitter 820-*a* may transmit one or more signals received from other components of the device 805-*a*. The transmitter 820-*a* may transmit information over a primary carrier associated with a primary cell and one or more secondary carriers associated with secondary cells. In some examples, the transmitter 820-*a* may be collocated with the receiver 810-*a* in a transceiver. The transmitter 820-*a* may be configured to operate using a single antenna, or it may be configured to employ transmit diversity techniques using a plurality of antennas (not shown).

The MCS table identification module 815-*a* may manage identification of an MCS table, from among a plurality of MCS tables, for uplink transmissions and comprise a DCI configuration module 910, an MCS table module 915, and an uplink transmission module 920. In some examples, the device 805-*a* may receive DCI from a serving eNB 105 via receiver 810-*a*, and DCI configuration module 910 may be configured to analyze the DCI to extract an MCS table reference. The MCS table reference may point to one of the MCS tables to be utilized for uplink transmissions. The DCI configuration module 910 may analyze the DCI to determine the MCS table reference by determining a format for the DCI and a configuration of the DCI.

In some examples, the DCI configuration module 910 may determine whether the format of the DCI is a DCI format 0 or a DCI format 4 to determine the configuration of the DCI to identify the MCS table reference. In some examples, a DCI format 0 may be associated with an MCS table supporting at least 256 QAM uplink transmissions via a physical uplink shared channel (PUSCH). Accordingly, the DCI configuration module 910 may determine that if the DCI has a format of DCI format 0, then the MCS table reference points to a non-legacy MCS table supporting higher-order modulation. In other aspects, the DCI format 0 may also be associated with legacy MCS tables. The DCI configuration module 910 may be configured to analyze other aspects of the configuration of the DCI to determine the MCS table reference.

In one example, the DCI configuration module 910 may determine which search space (or decoding candidate) the DCI is communicated in to identify the MCS table reference. If the DCI has a DCI format 0 and is communicated in a common search space, the DCI configuration module 910 may determine that the MCS table reference is associated with a legacy MCS table. If the DCI has a DCI format 0 and is communicated in a UE-specific search space, the DCI configuration module 910 may determine that the MCS table reference is associated with a non-legacy MCS table and that uplink transmissions may support 256 QAM.

In one example, the DCI configuration module 910 may determine from one or more bits in the DCI to identify the MCS table reference. As an example, assume there is one bit in the DCI for identifying the MCS table reference. If the bit in the DCI is 0, the DCI configuration module 910 may determine that the MCS table reference is associated with a legacy MCS table. If the bit in the DCI is 1, the DCI configuration module 910 may determine that the MCS table reference is associated with a non-legacy MCS table and that uplink transmissions may support 256 QAM.

In another example, the DCI configuration module 910 may determine which subframe the DCI is communicated in to identify the MCS table reference. If the DCI has a DCI format 0 and is communicated in a first subframe, the MCS table reference may be associated with a legacy MCS table. If the DCI has a DCI format 0 and is communicated in a second subframe, the MCS table reference may be associated with a non-legacy MCS table that may provide support for uplink transmissions of at least 256 QAM.

In another example, the DCI configuration module 910 may determine which power control loop is associated with PUSCH transmissions. If two uplink power control loops are utilized, the DCI configuration module 910 may determine if the scheduled PUSCH transmissions use the first uplink power control loop and, if so, that the MCS table reference is associated with a legacy MCS table. If the scheduled PUSCH transmissions use the second power control loop, the DCI configuration module 910 may determine that the MCS table reference is associated with a non-legacy MCS table and supports at least 256 QAM.

In another example, the DCI configuration module 910 may determine a type of control channel used to convey the DCI. If the DCI has a DCI format 0 and is communicated in a PDCCH, the DCI configuration module 910 may determine that the MCS table reference is associated with a legacy MCS table. If the DCI has a DCI format 0 and is communicated in an EPDCCH, the DCI configuration module 910 may determine that the MCS table reference is associated with a non-legacy MCS table and supports at least 256 QAM.

In another example, the DCI configuration module 910 may determine a resource index set for EPDCCH used to convey the DCI if the UE is configured with two or more EPDCCH resource sets. As an example, a UE may be configured with two EPDCCH resource sets. If the DCI is communicated in the first EPDCCH resource set, the DCI configuration module 910 may determine that the MCS table reference is associated with a legacy MCS table. If the DCI is communicated in the second EPDCCH resource set, the DCI configuration module 910 may determine that the MCS table reference is associated with a non-legacy MCS table and supports at least 256 QAM. Note that EPDCCH resource set dependent MCS table determination may be applicable for all DCI formats. Alternatively, EPDCCH resource set dependent MCS table determination may be applicable for some DCI formats but not others. As an example, it may be applicable for DCI format 4, but not for DCI format 0. Note that since the two or more EPDCCH resource sets may overlap, there may be some cases where the UE is unsure whether a DCI is from which EPDCCH resource set. In order to solve potential ambiguity in such cases, a predetermined rule can be defined. For example, for such cases, the MCS table reference may be based on the first EPDCCH resource set. Note also that EPDCCH resource set dependent MCS table determination may be applicable for both downlink and uplink transmissions. As an example, DCI format 1A may be associated with the legacy MCS table, which the mode-dependent DCI format scheduling PDSCH may be associated with the legacy MCS table if the DCI is communicated in a first EPDCCH resource set, while it may be associated with the new MCS table if the DCI is communicated in a second EPDCCH resource set.

In another example, the DCI configuration module 910 may determine a virtual cell ID associated with PUSCH if the UE is configured with two or more virtual cell IDs. As an example, a UE is configured with two virtual cell IDs. If the DCI indicates the first virtual cell ID for PUSCH, the DCI configuration module 910 may determine that the MCS table reference is associated with a legacy MCS table. If the DCI indicates the second virtual cell ID for PUSCH, the DCI configuration module 910 may determine that the MCS table reference is associated with a non-legacy MCS table and supports at least 256 QAM. Note also that virtual cell ID dependent MCS table determination may be applicable for both downlink and uplink transmissions. As an example, DCI format 1A may be associated with the legacy MCS table, which the mode-dependent DCI format scheduling PDSCH may be associated with the legacy MCS table if the DCI indicates a first virtual cell ID for PDSCH, while it may be associated with the new MCS table if the DCI indicates a second virtual cell ID for PDSCH.

In another example, the DCI configuration module 910 may determine a masking code used to mask the DCI to identify the MCS table reference. If a first masking code is used to mask the DCI, the DCI configuration module 910 may determine that an MCS table reference is associated with a legacy MCS table. If a second masking code is used to mask the DCI, the DCI configuration module 910 may determine that the MCS table reference is associated with a non-legacy MCS table and supports at least 256 QAM.

It is to be understood that other DCI format types may be used in addition to other configuration parameters described above to convey the MCS table reference. As one example, DCI format 4 may also be used as a DCI format to, at least in part, configure the DCI to convey the MCS table reference. Accordingly, indicating support for at least 256 QAM may be enabled while DCI format 0 may still be used for fallback operations. For example, such fallback operations may be used in operations where, if there is any ambiguity during radio resource control (RRC) configuration (or re-configuration) messaging whether at least 256 QAM is supported, the eNB may still communicate with the device 805-*a* in a manner which is preserved before and after the RRC (re-)configuration. As an example, if DCI format 0 being communicated in a common search space is associated with the legacy MCS table, and there is ambiguity regarding at least 256 QAM support during RRC configuration, the eNB can fall back and use DCI format 0 communicated in a common search space to communicate with the device 805-*a*.

The MCS table module 915 may exchange information with the DCI configuration module 910 to identify which MCS table, from a plurality of MCS tables, is to be used for uplink transmissions. The MCS table module 915 may receive the MCS table reference, for example, and identify whether a legacy MCS table or a non-legacy table is to be used for uplink transmissions.

The uplink transmission module 920 may communicate with the DCI configuration module 910, the MCS table module 915, or the transmitter 820-*a*, to modulate and code uplink transmissions according to the MCS table. If the MCS table is a legacy MCS table, the uplink transmission module 920 may modulate and code the uplink transmissions up to a modulation order of 6. If the MCS table is a non-legacy MCS table, the uplink transmission module 920 may modulate and code the uplink transmissions up to a modulation order of at least 8.

According to even further aspects, the DCI configuration module 910, the MCS table module 915, or the uplink transmission module 920 may be configured, individually or collectively, to identify or determine a parameter associated with power control for uplink transmissions on the PUSCH. For example, for legacy MCS tables, power control for uplink transmissions on PUSCH may be MCS based where a power offset adjustment for a UE may be MCS specific. For example, the power offset may be determined based on a bit-per-resource element (BPRE). The BPRE generally reflects the uplink spectral efficiency, a fixed parameter Ks when data is communicated on PUSCH. A formula defining such power offset may be:

$$\Delta_{TF,c}(i) = 10 \, \text{Log}_{10}(2^{BPRE \cdot K_s} - 1)$$

where $\Delta_{TF,c}(i)$ is the power offset and Ks is the fixed parameter. The aforementioned modules may be configured to identify that, when the MCS table identified for uplink transmissions is a legacy MCS table, the fixed parameter may be 1.25. However, if the MCS table identified for uplink transmissions is a non-legacy MCS table and supports at least 256 QAM, a different fixed parameter may be selected or identified that is associated with such higher order modulation (i.e., accounts for spectral efficiency offered by at least 256 QAM).

According to an even further aspect, the DCI configuration module 910, the MCS table module 915, or the uplink transmission module 920 may be configured, individually or collectively, to identify or determine an offset associated with uplink control information (UCI) that is communicated via PUSCH. Generally, when UCI is communicated via PUSCH, the amount of resources allocated for UCI may be associated with PUSCH parameters and a semi-static offset that is configured for the UE independently from hybrid automatic request repeat acknowledgement (HARQ-ACK), rank indicator (RI), CQI, respectively. Typically, the semi-static offset is independent of the MCS indices. When the MCS table is a non-legacy MCS table and supports at least 256 QAM, the aforementioned modules may determine or identify a separate set of offsets for at least some types of UCI. Such new offsets may be defined for the non-legacy MCS table or be defined for the MCS entries mapped to at least 256 QAM.

According to an even further aspect, CQI table reference may be associated with the DCI configuration module 910. Generally, for aperiodic channel state information (CSI) feedback, the configuration of the DCI may convey the reference to the appropriate CQI table and it may take a variety of forms (e.g., the DCI format, which search space the DCI is communicated in, one or more bits in the DCI, which subframe the DCI is located in, the type of control channel conveying the DCI, a resource set index associated with EPDCCH if a UE is configured with two or more EPDCCH resource sets, etc.). In some examples, the DCI may be configured to reference a legacy CQI table supporting CQI schemes up to 64 QAM. In other examples, the DCI may be configured to reference a non-legacy CQI table supporting CQI schemes up to at least 256 QAM. Accordingly, the eNB may send the appropriately configured DCI to the UE to indicate whether 256 QAM is supported while conserving control overhead resources.

Figure 10:
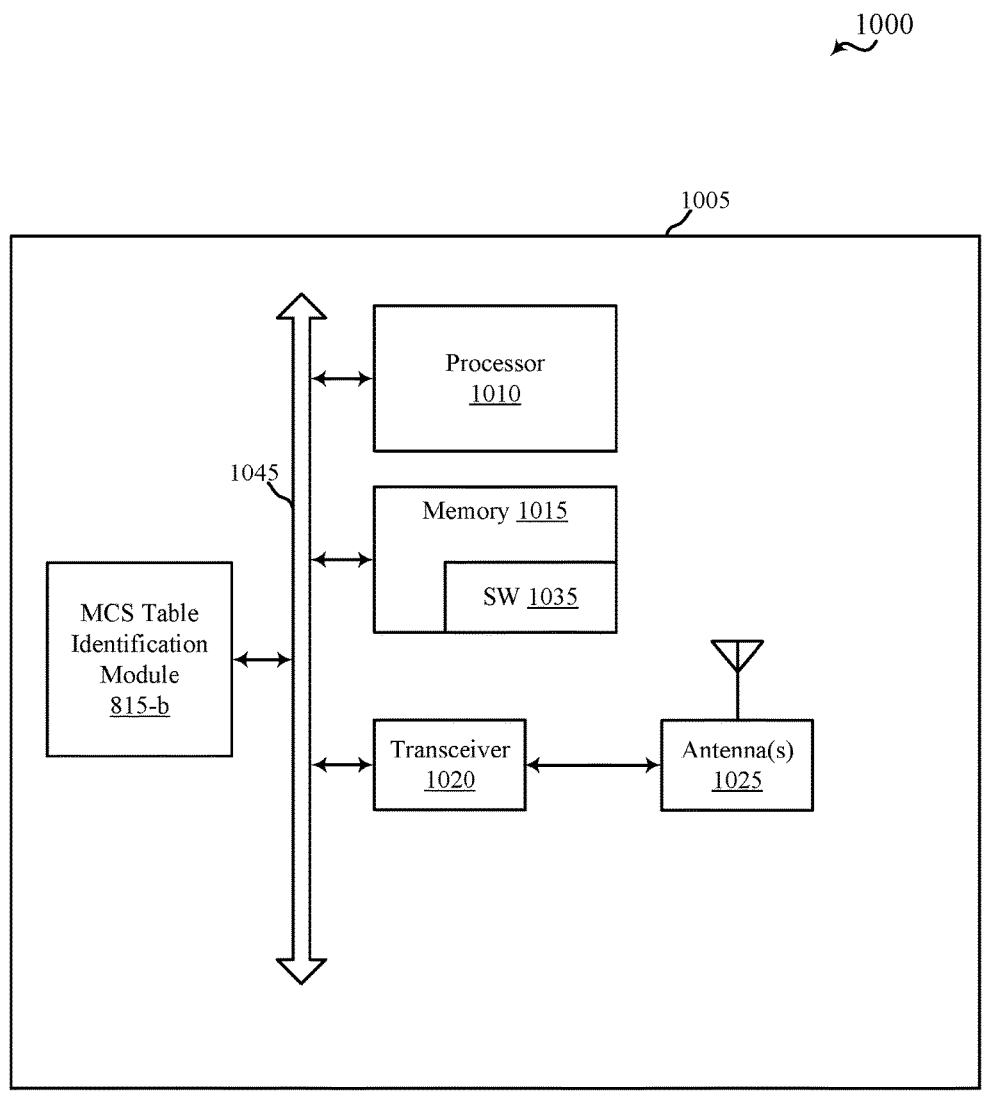
FIG. 10 shows a block diagram of an apparatus for indicating MCS in a wireless communication device according to various aspects of the present disclosure.

FIG. 10 shows a block diagram 1000 of an apparatus 1005 according to various examples. The apparatus 1005 may have any of a variety of configurations, such as that of a computer (e.g., a laptop computer, a netbook computer, a tablet computer, etc.), a cellular telephone, a PDA, a smartphone, a digital video recorder (DVR), an internet appliance, a gaming console, an e-reader, etc. The apparatus 1005 may have an internal power source (not shown), such as a small battery, to facilitate mobile operation. In some examples, the apparatus 1005 may be an example of one of the UEs 115 of FIG. 1, 2, 6, or 7 or the devices 805 of FIG. 8 or 9.

The apparatus 1005 may generally include components for bi-directional voice or data communication, and may include a processor 1010, memory 1015, a transceiver 1020, at least one antenna 1025, and an MCS table identification module 815-b. The MCS table identification module 815-b may be an example of one or more aspects of the MCS table identification modules 815 of FIG. 8 or 9. Some or all of these components may communicate with other ones of the components, directly or indirectly, over one or more buses 1045.

The transceiver 1020 may be coupled (e.g., connected) to the antenna 1025. The transceiver 1020 may be configured to bi-directionally communicate with one or more other devices via the antenna 1025, and may include a modem configured to modulate/demodulate packets transmitted/received via the antenna 1025. The devices with which the transceiver 1020 communicates may include access points (e.g., LTE eNBs, wireless local area network (WLAN) access points (APs), etc.), devices 805, or UEs 115.

The MCS table identification module 815-b may be configured to identify an MCS table to use for uplink transmissions. Generally, the MCS table identification module 815-b may be configured to receive a DCI, determine a format for the DCI and a configuration for the DCI to identify an MCS table reference. Based on the MCS table reference, the MCS table identification module 815-b may select or identify an MCS table from among a plurality of MCS tables. The identified MCS table may be a first MCS table supporting legacy modulation orders up to 6 or a second MCS table supporting modulation orders up to at least 8.

The memory 1015 may include random access memory (RAM) or read-only memory (ROM). The memory 1015 may store computer-readable, computer-executable software (SW) code 1035 containing instructions that are configured to, when executed, cause the processor 1010 or the MCS table identification module 815-b to perform one or more of the functions described herein for identifying an MCS table to be used for uplink transmissions in LTE. Alternately, the software code 1035 may not be directly executable by the processor 1010 but be configured to cause the apparatus 1005 (e.g., when compiled and executed) to perform one or more of the functions described herein.

The processor 1010 may include an intelligent hardware device (e.g., a CPU, a microcontroller, an ASIC, etc.). The processor 1010 may process information received via the transceiver 1020 from the antenna 1025, and may also process information to be transmitted from the antenna 1025 via the transceiver 1020. The processor 1010 may handle, alone or in connection with one or all of the software code 1035 and the MCS table identification module 815-b, various aspects of managing MCS table identification in the apparatus 1005 as described above.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 11:
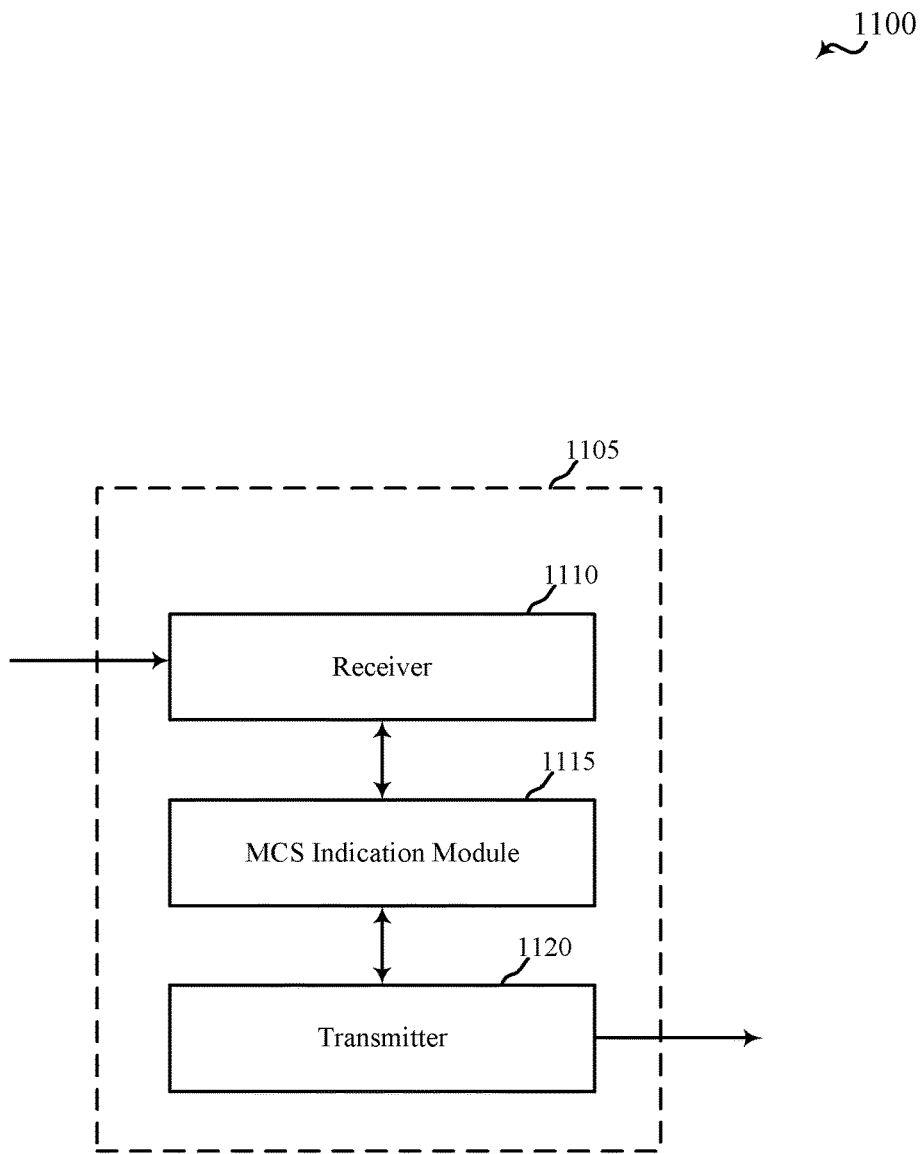
FIG. 11 shows a block diagram of a device according to various aspects of the present disclosure.

FIG. 11 shows a block diagram 1100 of a device 1105 according to various examples. In some examples, the device 1105 may illustrate aspects of one of the eNBs 105 of FIG. 1, 2, 6, or 7. The device 1105 may include a receiver 1110, an MCS indication module 1115, and a transmitter 1120. Each of these components may be in communication with each other, either directly or indirectly.

The components of the device 1105 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 1110 may receive information such as packets, user data, or control information associated with various information channels (e.g., control channels, data channels, etc.). The receiver 1110 may be configured to operate using a single antenna, or it may be configured to employ receive diversity techniques using a plurality of antennas (not shown). In some examples, the radio frequency spectrum may be used for LTE/LTE-A communications, as described, for example, with reference to any of FIG. 1 or 2. The receiver 1110 may be used to receive various types of data or control signals (i.e., transmissions) over one or more communication links of a wireless communication system, such as one or more communications links 125 of the wireless communication system 100 or 200 described with reference to FIG. 1 or 2, respectively. Examples of the types of data or control signals received by the receiver 1110 include uplink transmission via either PUCCH and PUSCH. Information may be passed on to and from the MCS indication module 1115, the transmitter 1120, and to other components of the device 1105.

The transmitter 1120 may transmit one or more signals received from other components of the device 1105. The transmitter 1120 may transmit information over a primary carrier associated with a primary cell and one or more secondary carriers associated with secondary cells. In some examples, the transmitter 1120 may be collocated with the receiver 1110 in a transceiver. The transmitter 1120 may be configured to operate using a single antenna, or it may be configured to employ transmit diversity techniques using a plurality of antennas (not shown). The transmitter 1120 may be used to transmit various types of data or control signals (i.e., transmissions) over one or more communication links of a wireless communication system, such as one or more communications links 125 of the wireless communication system 100 or 200 described with reference to FIG. 1 or 2, respectively.

The MCS indication module 1115 may manage indicating an MCS table for uplink transmissions. In some examples, the device 1105 may send DCI via transmitter 1120 and MCS indication module 1115 may be configured to indicate an MCS table reference by determining a format and a configuration for the DCI. The MCS table reference may point to one of the MCS tables to be utilized for uplink transmissions. The MCS indication module 1115 may determine whether at least 256 QAM is supported for uplink communications and, if so, configure the DCI to indicate at least 256 QAM is supported. The DCI format and the configuration of the DCI may provide for an MCS table reference that points to a legacy MCS table for uplink transmissions using lower order modulation (e.g., modulation order 6 for 64 QAM) or may point to a non-legacy MCS table for uplink transmissions using higher order modulation (e.g., modulation order 8 for 256 QAM). The MCS indication module 1115 may, alone or in combination with transmitter 1120, send the DCI to a UE along with a grant of uplink resources for the uplink transmissions on the PUSCH.

Figure 12:
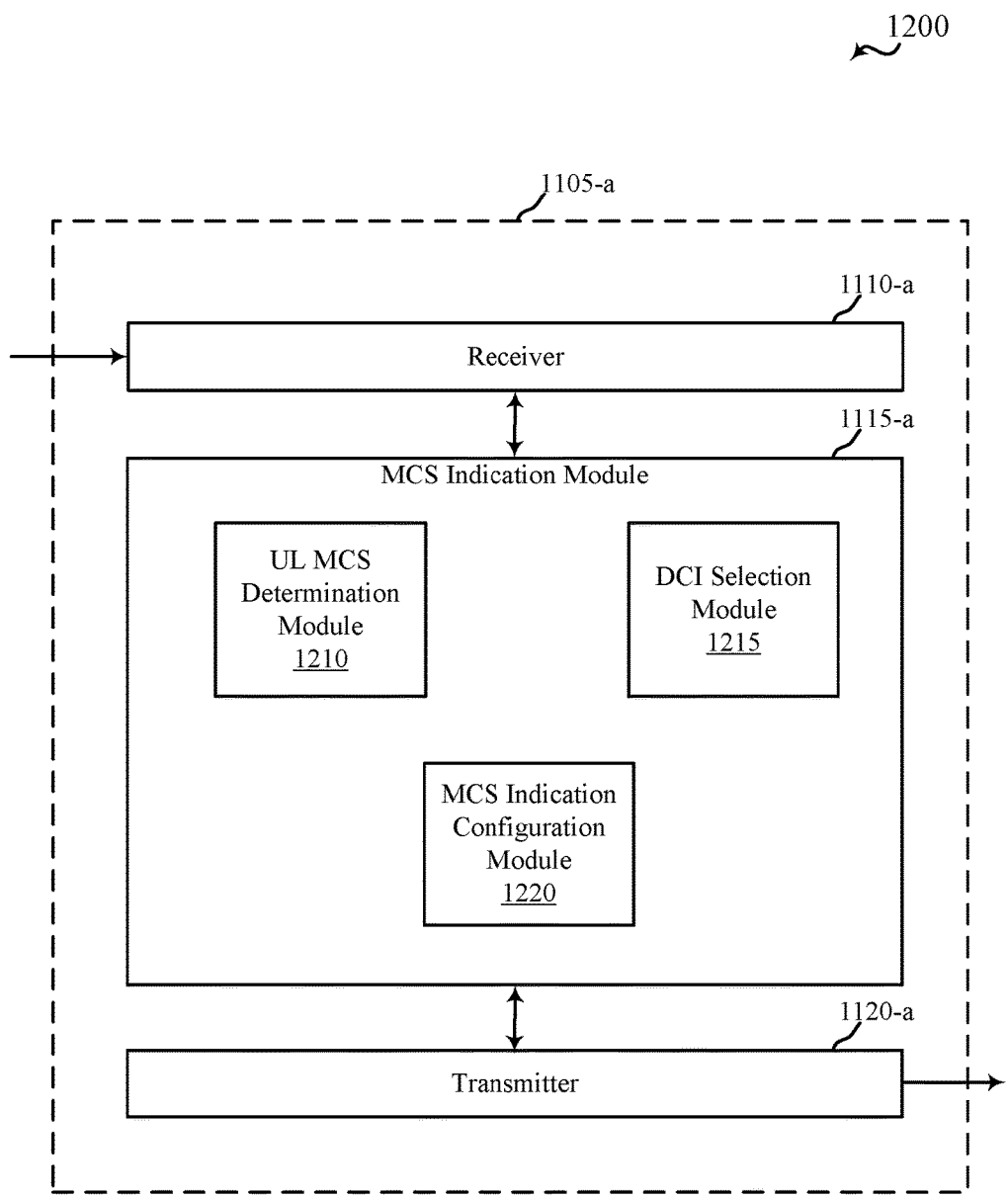
FIG. 12 shows a block diagram of another device according to various aspects of the present disclosure.

FIG. 12 shows a block diagram 1200 of a device 1105-*a* according to various examples. In some examples, the device 1105-*a* may illustrate aspects of one of the eNBs 105 of FIG. 1, 2, 6, or 7, or the device 1105 of FIG. 11. The device 1105-*a* may include a receiver 1110-*a*, an MCS indication module 1115-*a*, and a transmitter 1120-*a*. Each of these components may be in communication with each other, either directly or indirectly.

The receiver 1110-*a* may receive information such as packets, user data, or control information associated with various information channels (e.g., control channels, data channels, etc.). The receiver 1110-*a* may be configured to operate using a single antenna, or it may be configured to employ receive diversity techniques using a plurality of antennas (not shown). In some examples, the radio frequency spectrum may be used for LTE/LTE-A communications, as described, for example, with reference to any of FIG. 1 or 2. The receiver 1110-*a* may be used to receive various types of data or control signals (i.e., transmissions) over one or more communication links of a wireless communication system, such as one or more communications links 125 of the wireless communication system 100 or 200 described with reference to FIG. 1 or 2, respectively. Examples of the types of data or control signals received by the receiver 1110-*a* include uplink transmission via either PUCCH and PUSCH. Information may be passed on to and from the MCS indication module 1115-*a*, the transmitter 1120-*a*, and to other components of the device 1105-*a*.

The transmitter 1120-*a* may transmit one or more signals received from other components of the device 1105-*a*. The transmitter 1120-*a* may transmit information over a primary carrier associated with a primary cell and one or more secondary carriers associated with secondary cells. In some examples, the transmitter 1120-*a* may be collocated with the receiver 1110-*a* in a transceiver. The transmitter 1120-*a* may be configured to operate using a single antenna, or it may be configured to employ transmit diversity techniques using a plurality of antennas (not shown). The transmitter 1120-*a* may be used to transmit various types of data or control signals (i.e., transmissions) over one or more communication links of a wireless communication system, such as one or more communications links 125 of the wireless communication system 100 or 200 described with reference to FIG. 1 or 2, respectively.

The MCS indication module 1115-*a* may manage indicating an MCS table, from among a plurality of MCS tables, for uplink transmissions and may comprise an uplink MCS determination module 1210, a DCI selection module 1215, and an MCS indication configuration module 1220. In some examples, the device 1105-*a* may send DCI to a UE 115 via transmitter 1120-*a*. The uplink MCS determination module 1210 may be configured to determine which MCS may be supported for uplink transmissions. In some examples, the uplink MCS determination module 1210 may receive one or more CQI values in a CQI report from the UE and, based on the CQI value, select an MCS that the uplink communication channel may support. The uplink communication channel may be PUSCH and, dependent upon channel conditions, may support legacy or non-legacy MCSs. The uplink MCS determination module may select an MCS for uplink transmission accordingly and output information to the DCI selection module 1215, the MCS indication configuration module 1220, or the transmitter 1120-*a*.

The DCI selection module may be configured to select a DCI based, at least in part, on the configuration for the UE, the channel conditions, etc. The DCI selection module 1215 may be configured to select a format for the DCI based on the MCS table determined by the uplink MCS determination module 1210. In some cases, the DCI format may be predefined. In some examples, the format for the DCI may, at least in some aspects, provide a reference to which MCS table the UE may use for uplink transmissions. In other examples described below, the DCI format may provide an indication of a reference to the MCS table as well as support fallback operations to provide for protections from RRC configuration errors.

The MCS indication configuration module 1220 may be configured to send the DCI configured to convey the reference to the MCS table. The MCS table reference may point to one of the MCS tables to be utilized for uplink transmissions.

In some examples, the MCS indication configuration module 1220 may determine whether the format of the DCI is a DCI format 0 or a DCI format 4 to configure the DCI to indicate the MCS table reference. In some examples, a DCI format 0 may be associated with an MCS table supporting at least 256 QAM uplink transmissions via a physical uplink shared channel (PUSCH). Accordingly, the MCS indication configuration module 1220 may determine that the DCI is to have a predefined format of DCI format 0 such that the MCS table reference points to a non-legacy MCS table supporting higher order modulation. In other aspects, the DCI format 0 may also be associated with legacy MCS tables. The MCS indication configuration module 1220 may be configured to manage other aspects of the configuration of the DCI to indicate the MCS table reference.

In one example, the MCS indication configuration module 1220 may select a search space (or decoding candidate) in which the DCI is to be communicated in to indicate the MCS table reference. The MCS indication configuration module 1220 may select a DCI format 0 and that the DCI is to be communicated in a common search space to indicate the MCS table reference is associated with a legacy MCS table. The MCS indication configuration module 1220 may select a DCI format 0 and that the DCI is to be communicated in a UE-specific search space to indicate the MCS table reference is associated with a non-legacy MCS table and supports at least 256 QAM.

In another example, the MCS indication configuration module 1220 may indicate the MCS table reference by managing which subframe the DCI is communicated in. The MCS indication configuration module 1220 may select a DCI format 0 and that the DCI is to be communicated in a first subframe to indicate the MCS table reference is associated with a legacy MCS table. The MCS indication configuration module 1220 may select a DCI format 0 and that the DCI is to be communicated in a second subframe to indicate the MCS table reference is associated with a non-legacy MCS table and supports at least 256 QAM.

In another example, the MCS indication configuration module 1220 may indicate the MCS table reference by managing which power control loop is associated with PUSCH transmissions. If two uplink power control loops are utilized, the MCS indication configuration module 1220 may indicate the MCS table reference by, if the scheduled PUSCH transmission uses the first uplink power control loop, managing that the MCS table reference is associated with a legacy MCS table. If the scheduled PUSCH transmissions use the second power control loop, the MCS indication configuration module 1220 may indicate the MCS table reference is associated with a non-legacy MCS table and supports at least 256 QAM.

In another example, the MCS indication configuration module 1220 may indicate the MCS table reference by managing a type of control channel used to convey the DCI. The MCS indication configuration module 1220 may control that the DCI has a DCI format 0 and is communicated in a PDCCH to indicate that the MCS table reference is associated with a legacy MCS table. If the DCI has a DCI format 0 and is communicated in an EPDCCH, the MCS indication configuration module 1220 may indicate that the MCS table reference is associated with a non-legacy MCS table and supports at least 256 QAM.

In another example, the MCS indication configuration module 1220 may indicate the MCS table reference by controlling which masking code is used to mask the DCI. The MCS indication configuration module 1220 may use a first masking code to mask the DCI to indicate that an MCS table reference is associated with a legacy MCS table. The MCS indication configuration module 1220 may use a second masking code to mask the DCI to indicate that the MCS table reference is associated with a non-legacy MCS table and supports at least 256 QAM.

It is to be understood that other DCI format types may be used in addition to other configuration parameters described above to convey the MCS table reference. As one example, DCI format 4 may also be used as a DCI format to, at least in part, convey in the DCI the MCS table reference.

Figure 13:
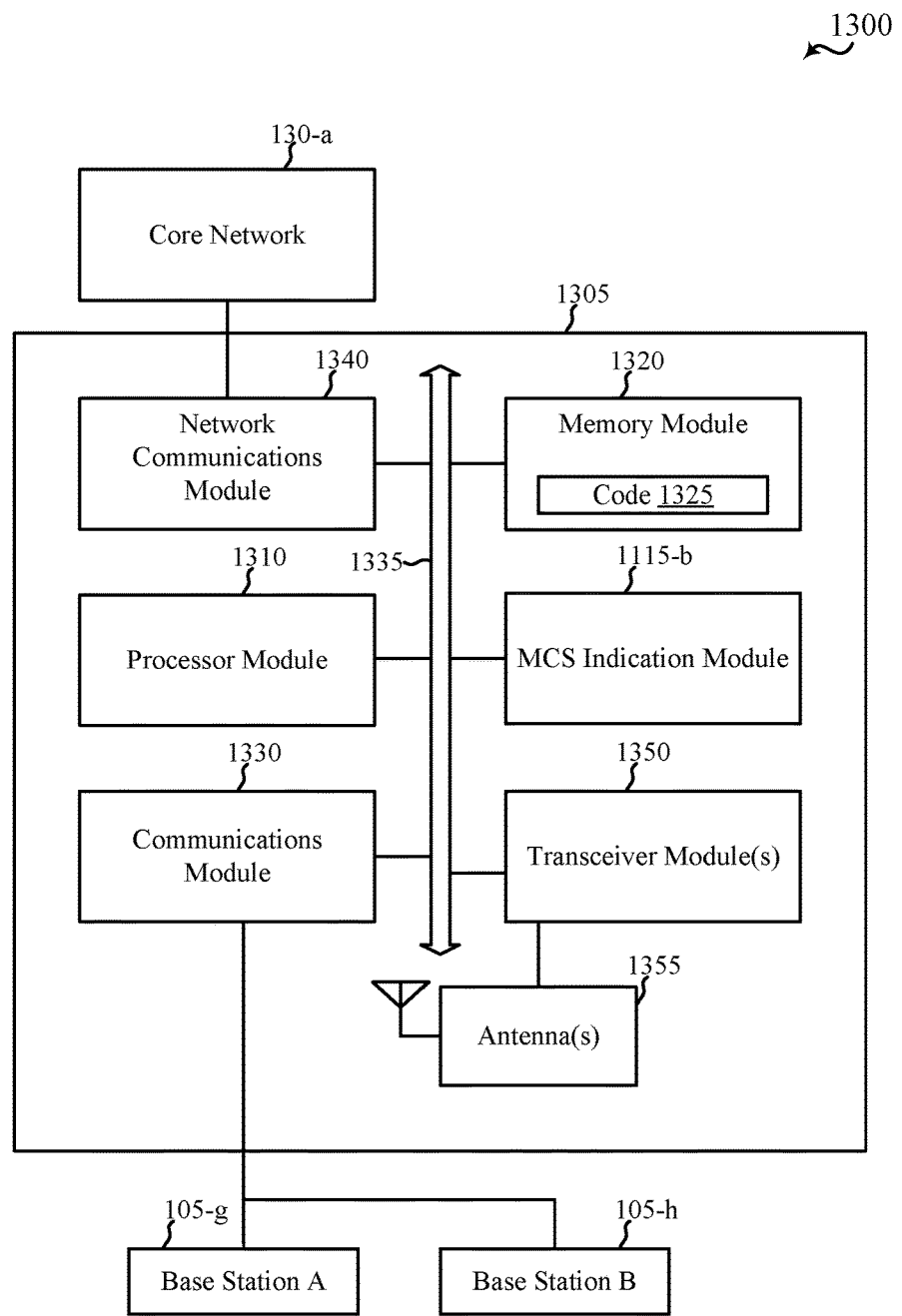
FIG. 13 shows a block diagram of another apparatus for indicating MCS in a wireless communication device according to various aspects of the present disclosure.

FIG. 13 shows a block diagram 1300 of an apparatus 1305 for use in wireless communication, in accordance with various aspects of the present disclosure. In some examples, the apparatus 1305 may be an example of aspects of one or more of the base stations 105 described with reference to any of FIG. 1 or 2 or aspects of one or more of the eNBs 105 described with reference to FIG. 6 or 7, or aspects of one or more of the devices 1105 described with reference to FIG. 11 or 12. The apparatus 1305 may be configured to implement or facilitate at least some of the base station or apparatus features and functions described herein.

The apparatus 1305 may include a processor module 1310, a memory module 1320, at least one transceiver module (represented by transceiver module(s) 1350), at least one antenna (represented by antenna(s) 1355), or an MCS indication module 1115-*b*. The apparatus 1305 may also include one or more of a communications module 1330 or a network communications module 1340. Each of these components may be in communication with each other, directly or indirectly, over one or more buses 1335.

The memory module 1320 may include RAM or ROM. The memory module 1320 may store computer-readable, computer-executable software code 1325 containing instructions that are configured to, when executed, cause the processor module 1310 to perform various functions described herein related to wireless communication or MCS indication. Alternatively, the computer-executable software code 1325 may not be directly executable by the processor module 1310 but be configured to cause the apparatus 1305 (e.g., when compiled and executed) to perform various of the functions described herein.

The processor module 1310 may include an intelligent hardware device (e.g., a central processing unit (CPU), a microcontroller, an ASIC, etc.). The processor module 1310 may process information received through the transceiver module(s) 1350, the communications module 1330, or the network communications module 1340. The processor module 1310 may also process information to be sent to the transceiver module(s) 1350 for transmission through the antenna(s) 1355, to the communications module 1330, for transmission to one or more other base stations 105-*g* and 105-*h*, or to the network communications module 1340 for transmission to a core network 130-*a*, which may be an example of one or more aspects of the core network 130 described with reference to FIG. 1. The processor module 1310 may handle, alone or in connection with the MCS indication module 1115-*b*, various aspects of communicating over a radio frequency spectrum.

The transceiver module(s) 1350 may include a modem configured to modulate packets and provide the modulated packets to the antenna(s) 1355 for transmission, and to demodulate packets received from the antenna(s) 1355. The transceiver module(s) 1350 may, in some examples, be implemented as one or more transmitter modules and one or more separate receiver modules. The transceiver module(s) 1350 may support communications using one or more radio access technologies. The transceiver module(s) 1350 may be configured to communicate bi-directionally, via the antenna(s) 1355, with one or more UEs or apparatuses, such as one or more of the UEs 115 described with reference to any of FIG. 1, 2, 6, or 7, or one or more of the devices 805 configured as a UE, as described with reference to FIG. 8 or 9. The apparatus 1305 may, for example, include multiple antennas 1355 (e.g., an antenna array). The apparatus 1305 may communicate with the core network 130-*a* through the network communications module 1340. The apparatus 1305 may also communicate with base stations, such as the base stations 105-*g* and 105-*h*, using the communications module 1330.

The MCS indication module 1115-*b* may be configured to perform or manage some or all of the features or functions described with reference to FIG. 1, 2, 6, 7, 11, or 12 related to MCS indication. The MCS indication module 1115-*b*, or portions of it, may include a processor, or some or all of the functions of the MCS indication module 1115-*b* may be performed by the processor module 1310 or in connection with the processor module 1310. In some examples, the MCS indication module 1115-*b* may be an example of the MCS indication module 1115 described with reference to FIG. 11 or 12.

Figure 14:
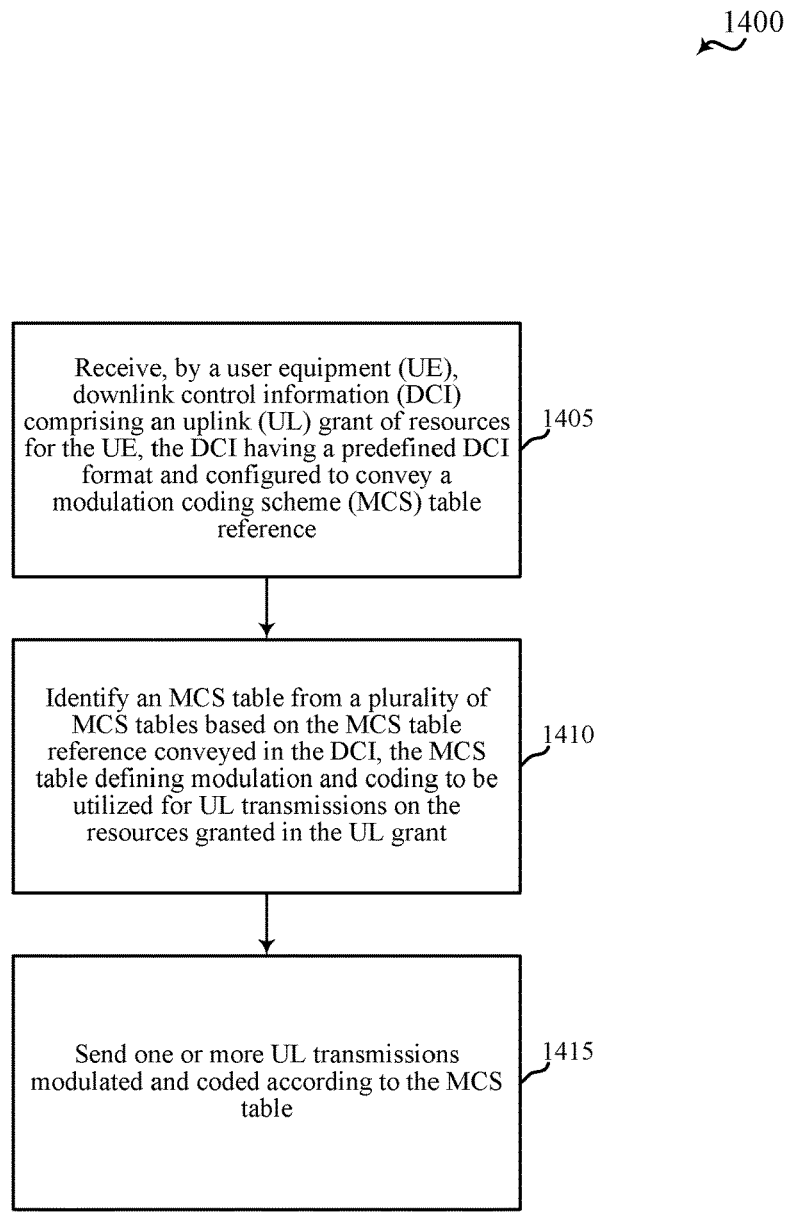
FIG. 14 shows an example method for indicating MCS according to various aspects of the present disclosure.

FIG. 14 illustrates an example method 1400 for indicating MCS, according to various examples. The method 1400 may be carried out using, for example, one of the UEs 115 of FIG. 1, 2, 6 or 7, the devices 805 of FIG. 8 or 9, or the apparatus 1005 of FIG. 10.

At block 1405, a UE receives downlink control information (DCI) comprising an uplink (UL) grant of resources for the UE, the DCI having a DCI format and configured to convey a modulation coding scheme (MCS) table reference. In some examples the DCI format may be predefined. The UE may receive the DCI from a serving base station. The DCI may be configured in a variety of manners to convey the reference to the MCS table. In some examples, the DCI may be configured such that the format of the DCI conveys the reference. In other examples, the format of the DCI in conjunction with other configuration parameters may convey the reference to the MCS table. At block 1410, the UE identifies an MCS table from a plurality of MCS tables based on the MCS table reference conveyed in the DCI, wherein the MCS table defines modulation and coding to be utilized for UL transmissions on the resources granted in the UL grant. The UE may identify a legacy MCS table or a non-legacy MCS table based on the MCS table reference. A legacy table may be associated with lower order modulation (e.g., modulation order 6). The non-legacy table may be associated with higher order modulation (e.g., modulation order 8).

At block 1415, one or more uplink transmissions are sent modulated and coded according to the identified MCS table. The uplink transmissions may be sent using the uplink grant of resources included in the DCI and may be sent on PUSCH. In some examples, the uplink transmissions may include UCI configured, at least in some aspects, according to the identified MCS table. In some examples, the transmission power offset of the uplink transmissions may be determined, at least in some aspects, according to the identified MCS table.

Figure 15:
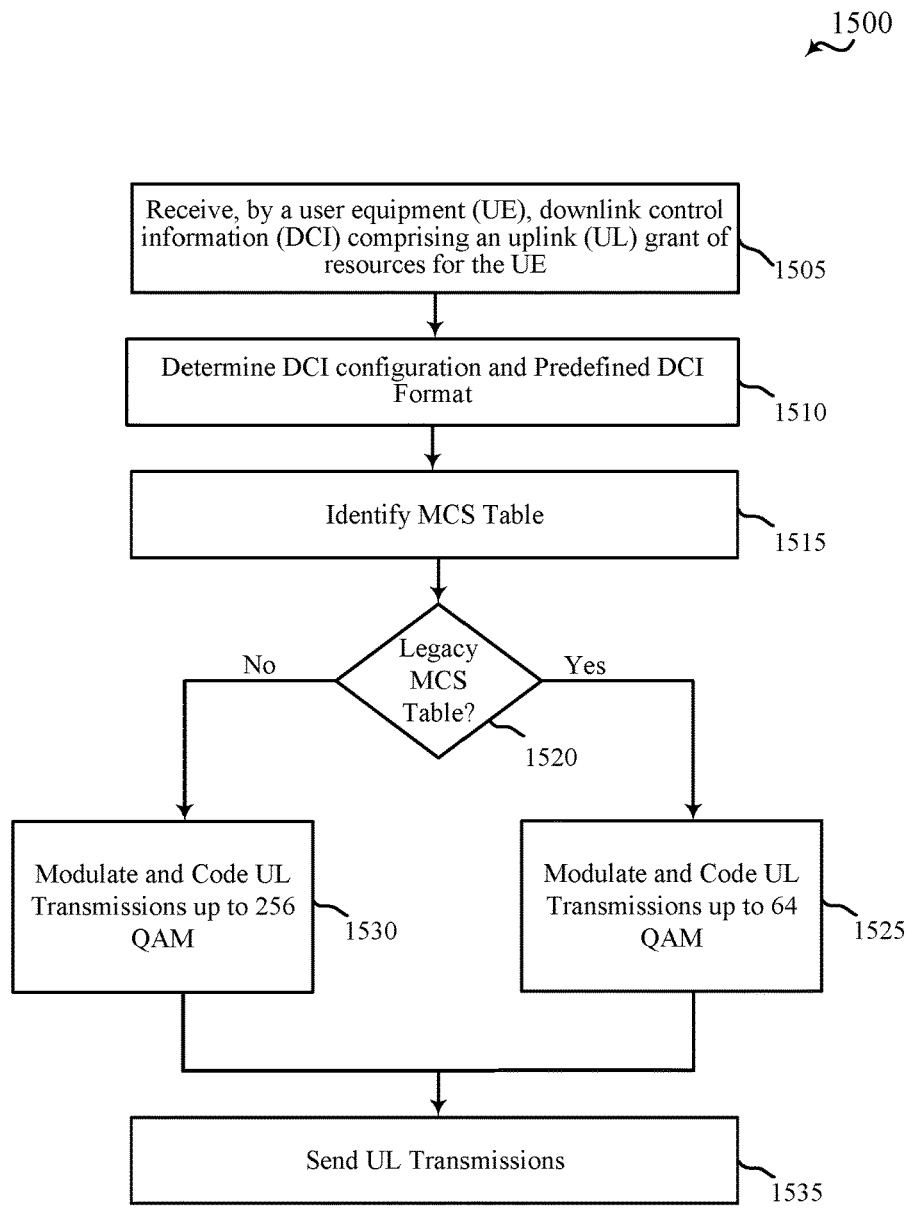
FIG. 15 shows another example method for indicating MCS according to various aspects of the present disclosure.

FIG. 15 illustrates an example method 1500 for indicating MCS, according to various examples. The method 1500 may be carried out using, for example, one of the UEs 115 of FIG. 1, 2, 6 or 7, the devices 805 of FIG. 8 or 9, or the apparatus 1005 of FIG. 10.

At block 1505, a UE receives downlink control information (DCI) comprising an uplink (UL) grant of resources for the UE, the DCI having a DCI format and configured to convey a modulation coding scheme (MCS) table reference. The DCI may receive the DCI from a serving base station. The DCI may be configured in a variety of manners to convey the reference to the MCS table.

At block 1510, the UE determines the DCI configuration and the format DCI format. In some examples, the DCI may be configured such that the format of the DCI conveys the reference. For example, a DCI having a predefined format of DCI format 0 (or 4) may be associated with a non-legacy MCS table. In other examples, the DCI format may be associated with legacy and non-legacy MCS tables and the format of the DCI, in conjunction with other configuration parameters, may convey the reference to the MCS table. For example, the UE may identify a search space the DCI is communicated in, one or more bits in the DCI, a type of control channel the DCI is communicated in, a resource set index associated with EPDCCH if a UE is configured with two or more EPDCCH resource sets, a masking code the DCI is masked with, etc., to determine the DCI configuration and the DCI format.

At block 1515, the UE identifies an MCS table. The identified MCS table may be from a plurality of MCS tables and may be identified based on the MCS table reference conveyed in the DCI. The MCS table may define modulation and coding to be utilized for UL transmissions on the resources granted in the UL grant. The UE may identify a legacy MCS table or a non-legacy MCS table based on the MCS table reference. At block 1520, a determination is made whether a legacy or a non-legacy MCS table has been identified. If a legacy table has been identified, the method 1500 may move to block 1525 where the information for uplink transmission may be modulated and coded with up to 64 QAM. If a non-legacy MCS table has been identified, the method 1500 may move to block 1530 where the information for uplink transmission may be modulated and coded with up to at least 256 QAM. At block 1535, the modulated and coded information is sent in uplink transmissions. The uplink transmissions may be sent using the uplink grant of resources included in the DCI and may be sent on PUSCH.

Figure 16:
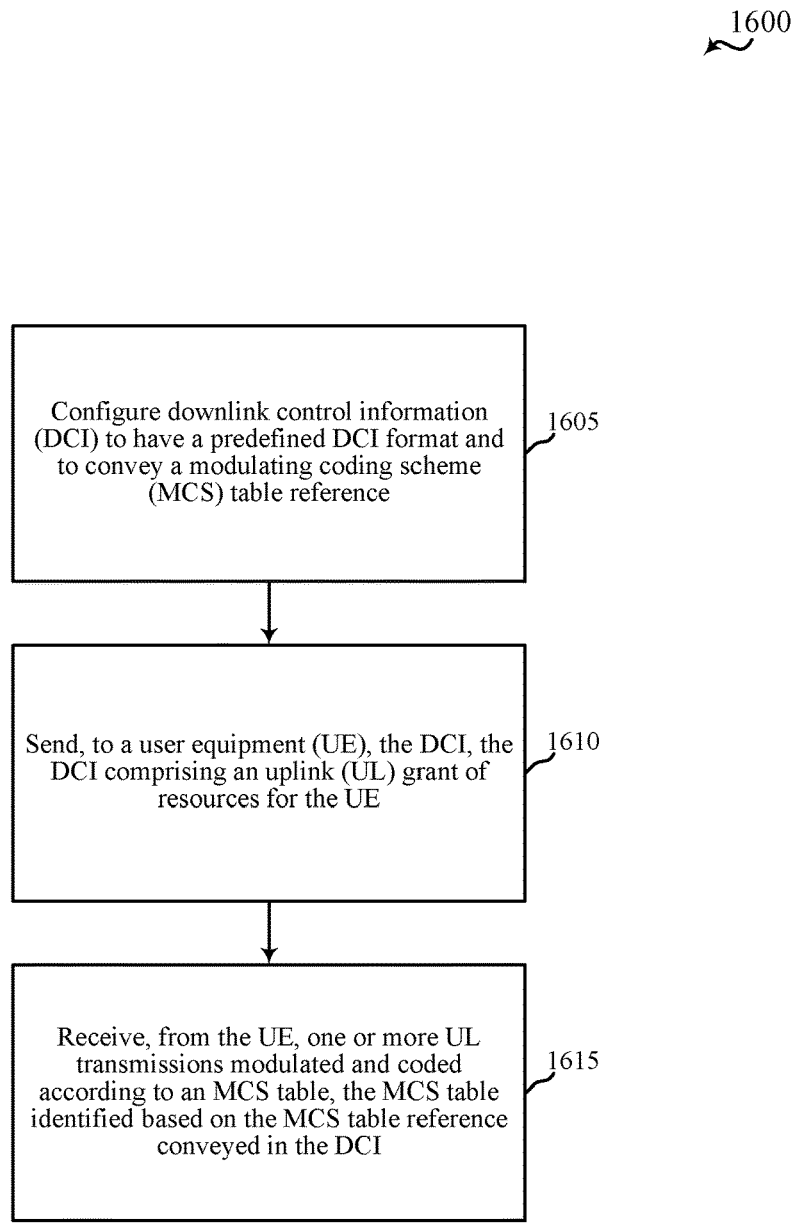
FIG. 16 shows another example method for indicating MCS according to various aspects of the present disclosure.

FIG. 16 illustrates an example method 1600 for indicating MCS, according to various examples. The method 1600 may be carried out using, for example, one of the eNBs 105 of FIG. 1, 2, 6 or 7, the devices 1105 of FIG. 11 or 12, or the apparatus 1305 of FIG. 13.

At block 1605, DCI is configured to have a DCI format and to convey an MCS table reference. In some cases, the DCI format may be predefined. The DCI may be configured in a variety of manners to convey the reference to the MCS table. In some examples, the DCI may be configured such that the format of the DCI conveys the reference. In other examples, the format of the DCI, in conjunction with other configuration parameters, convey the reference to the MCS table. At block 1610, the DCI is sent to a UE, the DCI comprising an uplink grant of resources for the UE. The UE may determine the reference to the MCS table conveyed in the DCI and identify an MCS table based on the reference. The MCS table may define modulation and coding to be utilized for UL transmissions on the resources granted in the UL grant. The UE may identify a legacy MCS table or a non-legacy MCS table based on the MCS table reference. A legacy table may be associated with lower order modulation (e.g., modulation order 6). The non-legacy table may be associated with higher order modulation (e.g., modulation order 8). The UE may modulate and code information to be sent in uplink transmissions based on the identified MCS table.

At block 1615, one or more uplink transmissions are received from the UE, the uplink transmissions are modulated and coded according to the MCS table identified from a plurality of MCS tables identified based on the MCS table reference. The uplink transmissions may be received on resources provided in the uplink grant included in the DCI.

Further examples of the foregoing principles and methods are described as follows. For example, a method for wireless communications may include: receiving, by a user equipment (UE), downlink control information (DCI) comprising an uplink (UL) grant of resources for the UE, the DCI having a DCI format and configured to convey a modulation coding scheme (MCS) table reference; identifying an MCS table from a plurality of MCS tables based on the MCS table reference conveyed in the DCI, wherein the MCS table defines modulation and coding to be utilized for UL transmissions on the resources granted in the UL grant; and sending one or more UL transmissions modulated and coded according to the MCS table.

In some aspects, the DCI may convey the MCS table reference based on a type of a control channel the DCI is communicated on. The method may include selecting a first MCS table based on the DCI being communicated on a PDCCH frame and selecting a second MCS table based on the DCI being communicated on an EPDCCH frame. The DCI may convey the MCS table reference based on a masking code used to mask the DCI. The method may include the DCI masked with a first masking code is associated with a first MCS table, and the DCI masked with a second masking code is associated with a second MCS table.

In some aspects, the method may include determining an uplink control information (UCI) offset parameter associated with the identified MCS table, wherein a first UCI offset parameter is associated with a first MCS table associated and a second UCI offset parameter is associated with a second MCS table. The method may include determining a number of resource elements for multiplexing the UCI with at least one of the one or more UL transmissions based on the UCI offset parameter. The UCI may include one or more of a hybrid automatic request repeat acknowledgement (HARQ-ACK), a rank indicator (RI), and a channel quality indicator (CQI). The identified MCS table may be a non-legacy MCS table associated with up to 256 quadrature amplitude modulation and the method may include receiving an indication of up to a 256 quadrature amplitude modulation for downlink (DL) transmissions, the DL transmission indication being separate from the DCI.

In another set of illustrative examples, an apparatus for wireless communications is described. The apparatus may include a processor, memory in electronic communication with the processor, and instructions being executable by the processor. The instructions may be executable to: receive, by a user equipment (UE), downlink control information (DCI) comprising an uplink (UL) grant of resources for the UE, the DCI having a DCI format and configured to convey a modulation coding scheme (MCS) table reference; identify an MCS table from a plurality of MCS tables based on the MCS table reference conveyed in the DCI, wherein the MCS table defines modulation and coding to be utilized for UL transmissions on the resources granted in the UL grant; and send one or more UL transmissions modulated and coded according to the MCS table.

In some examples, the instructions may be executable to select a first MCS table based on the DCI being included in a first subframe of the PDCCH frame and selecting a second MCS table based on the DCI being included in the second subframe of the PDCCH frame. In some aspects, the instructions may be executable to receive a configuration of two or more EPDCCH resource sets, and select a first MCS table based on the DCI being communicated in a first EPDCCH resource set and selecting a second MCS table based on the DCI being communicated in the second EPDCCH resource set.

In some aspects, the DCI may convey the MCS table reference based on a type of a control channel the DCI is communicated on. The instructions may be executable to select a first MCS table based on the DCI being communicated on a PDCCH frame and selecting a second MCS table based on the DCI being communicated on an EPDCCH frame. The DCI may convey the MCS table reference based on a masking code used to mask the DCI. The DCI may be masked with a first masking code is associated with a first MCS table, and the DCI may be masked with a second masking code is associated with a second MCS table.

In another set of illustrative examples, an apparatus for wireless communications is described. The apparatus may include: means for receiving, by a user equipment (UE), downlink control information (DCI) comprising an uplink (UL) grant of resources for the UE, the DCI having a DCI format and configured to convey a modulation coding scheme (MCS) table reference; means for identifying an MCS table from a plurality of MCS tables based on the MCS table reference conveyed in the DCI, wherein the MCS table defines modulation and coding to be utilized for UL transmissions on the resources granted in the UL grant; and means for sending one or more UL transmissions modulated and coded according to the MCS table.

In some aspects, the DCI may convey the MCS table reference based on which subframe of a physical downlink control channel (PDCCH) the DCI is communicated in. The apparatus may include means for selecting a first MCS table based on the DCI being included in a first subframe of the PDCCH frame and selecting a second MCS table based on the DCI being included in the second subframe of the PDCCH. The DCI may convey the MCS table reference based on a masking code used to mask the DCI. The DCI masked with a first masking code may be associated with a first MCS table, and the DCI masked with a second masking code may be associated with a second MCS table.

The apparatus may include means for determining an uplink control information (UCI) offset parameter associated with the identified MCS table, wherein a first UCI offset parameter may be associated with a first MCS table associated and a second UCI offset parameter may be associated with a second MCS table.

In some aspects, the apparatus may include means for determining a number of resource elements for multiplexing the UCI with at least one of the one or more UL transmissions based on the UCI offset parameter. The UCI may include at least one of a hybrid automatic request repeat acknowledgement (HARQ-ACK), a rank indicator (RI), or a channel quality indicator (CQI). The identified MCS table may be a non-legacy MCS table associated with up to 256 quadrature amplitude modulation and the apparatus may include means for receiving an indication of up to a 256 quadrature amplitude modulation for downlink (DL) transmissions, the DL transmission indication being separate from the DCI.

In another set of illustrative examples, a non-transitory computer-readable medium for wireless communications stores instructions executable by a processor to: receive, by a user equipment (UE), downlink control information (DCI) comprising an uplink (UL) grant of resources for the UE, the DCI having a DCI format and configured to convey a modulation coding scheme (MCS) table reference; identify an MCS table from a plurality of MCS tables based on the MCS table reference conveyed in the DCI, wherein the MCS table defines modulation and coding to be utilized for UL transmissions on the resources granted in the UL grant; and send one or more UL transmissions modulated and coded according to the MCS table.

In some aspects, the plurality of MCS tables may include at least a legacy MCS table associated with quadrature amplitude modulation up to a first order and a non-legacy MCS table associated with quadrature amplitude modulation up to a second order, wherein the second order is higher than the first order. The DCI may convey the MCS table reference based on a search space of a physical downlink control channel (PDCCH) the DCI is communicated in. The instructions may be executable to determine whether the DCI is included in a common search space of the PDCCH frame or a UE-specific search space of the PDCCH frame. The non-transitory computer-readable medium may include instructions executable to select a first MCS table based on the DCI being included in the common search space of the PDCCH frame and selecting a second MCS table based on the DCI being included in the UE-specific search space of the PDCCH frame.

In some aspects, the DCI may convey the MCS table reference based on which subframe of a physical downlink control channel (PDCCH) the DCI is communicated in. The non-transitory computer-readable medium may include instructions executable to select a first MCS table based on the DCI being included in a first subframe of the PDCCH frame and selecting a second MCS table based on the DCI being included in the second subframe of the PDCCH frame. The DCI format may be one or more of a DCI format 0 or a DCI format 4.

In some aspects, the DCI may convey the MCS table reference based on a type of a control channel the DCI is communicated on. The non-transitory computer-readable medium may include instructions executable to select a first MCS table based on the DCI being communicated on a PDCCH frame and selecting a second MCS table based on the DCI being communicated on an EPDCCH frame. The DCI may convey the MCS table reference based on a masking code used to mask the DCI. The DCI masked with a first masking code may be associated with a first MCS table, and the DCI masked with a second masking code may be associated with a second MCS table. The instructions executable to identify the MCS table may be executable to identify an MCS table index, and determine an entry of a first MCS table or a second MCS table based on the MCS table index, wherein the first MCS table and the second MCS table share one or more common entries.

In some aspects, the instructions to identify the MCS table may be executable to identify one or more bits in the DCI, and select an MCS table from the plurality of MCS tables based on the identified one or more bits. The non-transitory computer-readable medium may include instructions executable to determine a power offset parameter associated with the identified MCS table, wherein a first power offset parameter is associated with a first MCS table and a second power offset parameter is associated with a second MCS table. The non-transitory computer-readable medium may include instructions executable to determine a transmit power for at least one of the one or more UL transmissions based on the power offset parameter.

In some aspects, the non-transitory computer-readable medium may include instructions executable to receive a configuration of two or more EPDCCH resource sets, and select a first MCS table based on the DCI being communicated in a first EPDCCH resource set and selecting a second MCS table based on the DCI being communicated in the second EPDCCH resource set.

In some aspects, the non-transitory computer-readable medium may include instructions executable to determine an uplink control information (UCI) offset parameter associated with the identified MCS table, wherein a first UCI offset parameter is associated with a first MCS table associated and a second UCI offset parameter is associated with a second MCS table. The non-transitory computer-readable medium may include instructions executable to determine a number of resource elements for multiplexing the UCI with at least one of the one or more UL transmissions based on the UCI offset parameter. The UCI may include at least one of a hybrid automatic request repeat acknowledgement (HARQ-ACK), a rank indicator (RI), or a channel quality indicator (CQI). The identified MCS table may be a non-legacy MCS table associated with up to 256 quadrature amplitude modulation and the instructions may be executable to receive an indication of up to a 256 quadrature amplitude modulation for downlink (DL) transmissions, the DL transmission indication being separate from the DCI.

In another set of illustrative examples, a method for wireless communications is described. The method may include: configuring downlink control information (DCI) to have a DCI format and to convey a modulation coding scheme (MCS) table reference; sending, to a user equipment (UE), the DCI, the DCI comprising an uplink (UL) grant of resources for the UE; and receiving, from the UE, one or more UL transmissions modulated and coded according to an MCS table from a plurality of MCS tables, the MCS table identified based on the MCS table reference conveyed in the DCI.

In some aspects, configuring the DCI to convey the MCS may include one or more of identifying a search space of a physical downlink control channel (PDCCH) to communicate the DCI in, identifying which subframe of the PDCCH to communicate the DCI in, or identifying a masking code to use to mask the DCI. The DCI format may be one or more of a DCI format 0 or a DCI format 4. Configuring the DCI to convey the MCS table reference indicates to the UE to identify one or more of a legacy MCS table associated with quadrature amplitude modulation up to a first order or a non-legacy MCS table associated with quadrature amplitude modulation up to a second order, wherein the second order is higher than the first order.

In another set of illustrative examples, an apparatus for wireless communications is described. The apparatus may include a processor, memory in electronic communication with the processor, and instructions being executable by the processor. The instructions may be executable to: configure downlink control information (DCI) to have a DCI format and to convey a modulation coding scheme (MCS) table reference; send, to a user equipment (UE), the DCI, the DCI comprising an uplink (UL) grant of resources for the UE; and receive, from the UE, one or more UL transmissions modulated and coded according to an MCS table from a plurality of MCS tables, the MCS table identified based on the MCS table reference conveyed in the DCI.

In some aspects, the instructions executable to configure the DCI to convey the MCS may include one or more of instructions executable to identify a search space of a physical downlink control channel (PDCCH) to communicate the DCI in, identify which subframe of the PDCCH to communicate the DCI in, or identify a masking code to use to mask the DCI. The DCI format may be one or more of a DCI format 0 or a DCI format 4. The instructions executable to configure the DCI to convey the MCS table reference indicates to the UE to identify one or more of a legacy MCS table associated with quadrature amplitude modulation up to a first order or a non-legacy MCS table associated with quadrature amplitude modulation up to a second order, wherein the second order is higher than the first order.

In another set of illustrative examples, an apparatus for wireless communications is described. The apparatus may include: means for configuring downlink control information (DCI) to have a DCI format and to convey a modulation coding scheme (MCS) table reference; means for sending, to a user equipment (UE), the DCI, the DCI comprising an uplink (UL) grant of resources for the UE; and means for receiving, from the UE, one or more UL transmissions modulated and coded according to an MCS table from a plurality of MCS tables, the MCS table identified based on the MCS table reference conveyed in the DCI.

In some aspects, the means for configuring the DCI to convey the MCS may include one or more of means for identifying a search space of a physical downlink control channel (PDCCH) to communicate the DCI in, means for identifying which subframe of the PDCCH to communicate the DCI in, or means for identifying a masking code to use to mask the DCI. The DCI format may be one or more of a DCI format 0 or a DCI format 4. The means for configuring the DCI to convey the MCS table reference indicates to the UE to identify one or more of a legacy MCS table associated with quadrature amplitude modulation up to a first order or a non-legacy MCS table associated with quadrature amplitude modulation up to a second order, wherein the second order is higher than the first order.

In another set of illustrative examples, a non-transitory computer-readable medium for wireless communications is described. The non-transitory computer-readable medium may include a non-transitory computer-readable medium storing instructions executable by a processor. The instructions may be executable by the processor to: configure downlink control information (DCI) to have a DCI format and to convey a modulation coding scheme (MCS) table reference; send, to a user equipment (UE), the DCI, the DCI comprising an uplink (UL) grant of resources for the UE; and receive, from the UE, one or more UL transmissions modulated and coded according to an MCS table from a plurality of MCS tables, the MCS table identified based on the MCS table reference conveyed in the DCI.

In some aspects, the instructions executable to configure the DCI to convey the MCS may include one or more of instructions executable to identify a search space of a physical downlink control channel (PDCCH) to communicate the DCI in, instructions executable to identify which subframe of the PDCCH to communicate the DCI in, or instructions executable to identify a masking code to use to mask the DCI. The DCI format may be one or more of a DCI format 0 or a DCI format 4. The instructions executable to configure the DCI to convey the MCS table reference indicates to the UE to identify one or more of a legacy MCS table associated with quadrature amplitude modulation up to a first order or a non-legacy MCS table associated with quadrature amplitude modulation up to a second order, wherein the second order is higher than the first order.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. For clarity, the description above describes LTE, WLAN, and BT systems for purposes of example, and corresponding terminology is used in much of the description above, although the techniques are applicable beyond these applications.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors), one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   determining, by a user equipment (UE), a search space of a physical downlink control channel (PDCCH) for receiving downlink control information (DCI);
   receiving the DCI comprising an uplink (UL) grant of resources for the UE, the DCI having a DCI format and configured to convey a modulation coding scheme (MCS) table reference;
   identifying an MCS table from a plurality of MCS tables based at least in part on the MCS table reference conveyed in the DCI;
   determining a modulation order for UL transmissions based at least in part on the search space of the PDCCH for receiving the DCI and the identified MCS table; and
   sending one or more UL transmissions according to the determined modulation order.

2. The method of claim 1, wherein the plurality of MCS tables comprise at least a legacy MCS table associated with quadrature amplitude modulation up to a first order and a non-legacy MCS table associated with quadrature amplitude modulation up to a second order, wherein the second order is higher than the first order.

3. The method of claim 1, further comprising:
   determining whether the DCI is included in a common search space or a UE-specific search space; and
   selecting a first MCS table based on the DCI being included in the common search space and selecting a second MCS table based on the DCI being included in the UE-specific search space.

4. The method of claim 3, wherein the second MCS table is a non-legacy MCS table associated with a modulation up to at least 256 quadrature amplitude modulation.

5. The method of claim 1, wherein the DCI conveys the MCS table reference based at least on one of a type of a control channel on which the DCI is communicated, a masking code used to mask the DCI, or a subframe of the PDCCH on which the DCI is communicated.

6. The method of claim 1, wherein the DCI format is one or more of a DCI format 0 or a DCI format 4.

7. The method of claim 1, further comprising:
   receiving a configuration of two or more enhanced physical downlink control channel (EPDCCH) resource sets; and
   selecting a first MCS table based on the DCI being communicated in a first EPDCCH resource set and selecting a second MCS table based on the DCI being communicated in a second EPDCCH resource set.

8. The method of claim 1, wherein identifying the MCS table comprises:
   identifying an MCS table index, and
   determining an entry of a first MCS table or a second MCS table based on the MCS table index, wherein the first MCS table and the second MCS table share one or more common entries.

9. The method of claim 1, further comprising:
   identifying one or more bits in the DCI, and
   wherein the determining the modulation order comprises determining the modulation order for the UL transmissions based at least in part on the search space of the PDCCH for receiving the DCI, the identified MCS table, and the identified one or more bits in the DCI.

10. The method of claim 1, further comprising:
    determining a power offset parameter associated with the identified MCS table, wherein a first power offset parameter is associated with a first MCS table and a second power offset parameter is associated with a second MCS table.

11. The method of claim 10, further comprising determining a transmit power for at least one of the one or more UL transmissions based on the power offset parameter.

12. The method of claim 1, further comprising:
    determining an uplink control information (UCI) offset parameter associated with the identified MCS table, wherein a first UCI offset parameter is associated with a first MCS table associated and a second UCI offset parameter is associated with a second MCS table.

13. The method of claim 12, further comprising determining a number of resource elements for multiplexing the UCI with at least one of the one or more UL transmissions based on the UCI offset parameter.

14. The method of claim 13, wherein the UCI comprises one or more of a hybrid automatic request repeat acknowledgement (HARQ-ACK), a rank indicator (RI), and a channel quality indicator (CQI).

15. The method of claim 1, wherein the identified MCS table is a non-legacy MCS table associated with a modulation up to at least 256 quadrature amplitude modulation.

16. An apparatus for wireless communications, comprising:
    a processor;
    memory in communication with the processor; and
    instructions executable by the processor to:
       determine, by a user equipment (UE), a search space of a physical downlink control channel (PDCCH) for receiving downlink control information (DCI);
       receive the DCI comprising an uplink (UL) grant of resources for the UE, the DCI having a DCI format and configured to convey a modulation coding scheme (MCS) table reference;
       identify an MCS table from a plurality of MCS tables based at least in part on the MCS table reference conveyed in the DCI;

determine a modulation order for UL transmissions based at least in part on the search space of the PDCCH for receiving the DCI and the identified MCS table; and send one or more UL transmissions according to the determined modulation order.

17. The apparatus of claim 16, wherein the plurality of MCS tables comprise at least a legacy MCS table being associated with quadrature amplitude modulation up to a first order and a non-legacy MCS table being associated with quadrature amplitude modulation up to a second order, wherein the second order is greater than the first order.

18. The apparatus of claim 16, wherein the instructions are further executable to:

determine whether the DCI is included in a common search space or a UE-specific search space; and select a first MCS table based on the DCI being included in the common search space and selecting a second MCS table based on the DCI being included in the UE-specific search space.

19. The apparatus of claim 18, wherein the second MCS table is a non-legacy MCS table associated with a modulation up to at least 256 quadrature amplitude modulation.

20. The apparatus of claim 16, wherein the DCI conveys the MCS table reference based on one of a type of a control channel the DCI is communicated on, a masking code used to mask the DCI, or which subframe of the PDCCH on which the DCI is communicated.

21. The apparatus of claim 16, wherein the DCI format is one or more of a DCI format 0 or a DCI format 4.

22. The apparatus of claim 16, further comprising instructions executable to:

receive a configuration of two or more enhanced physical downlink control channel (EPDCCH) resource sets; and select a first MCS table based on the DCI being communicated in a first EPDCCH resource set and selecting a second MCS table based on the DCI being communicated in a second EPDCCH resource set.

23. The apparatus of claim 16, wherein the instructions executable to identify the MCS table are further executable to:

identify an MCS table index, and determine an entry of a first MCS table or a second MCS table based on the MCS table index, wherein the first MCS table and the second MCS table share one or more common entries.

24. The apparatus of claim 16, further comprising instructions executable to:

identify one or more bits in the DCI, and wherein the instructions executable to determine the modulation order are further executable to determine the modulation order for the UL transmissions based at least in part on the search space of the PDCCH for receiving the DCI, the identified MCS table, and the identified one or more bits in the DCI.

25. The apparatus of claim 16, further comprising instructions executable to:

determine a power offset parameter associated with the identified MCS table, wherein a first power offset parameter is associated with a first MCS table and a second power offset parameter is associated with a second MCS table.

26. The apparatus of claim 25, further comprising instructions executable to determine a transmit power for at least one of the one or more UL transmissions based on the power offset parameter.

27. A non-transitory computer-readable medium for wireless communications storing instructions executable by a processor to:

determine, by a user equipment (UE), a search space of a physical downlink control channel (PDCCH) for receiving downlink control information (DCI);

receive the DCI comprising an uplink (UL) grant of resources for the UE, the DCI having a DCI format and configured to convey a modulation coding scheme (MCS) table reference;

identify an MCS table from a plurality of MCS tables based at least in part on the MCS table reference conveyed in the DCI;

determine a modulation order for UL transmissions based at least in part on the search space of the PDCCH for receiving the DCI and the identified MCS table; and send one or more UL transmissions according to the determined modulation order.

28. A method for wireless communications, comprising:

configuring downlink control information (DCI) to have a DCI format and to convey a modulation coding scheme (MCS) table reference;

sending, to a user equipment (UE), the DCI in one of a common search space or a UE-specific search space of a physical downlink control channel (PDCCH), the DCI comprising an uplink (UL) grant of resources for the UE; and receiving, from the UE, one or more UL transmissions modulated according to a modulation order based at least in part on whether the DCI is sent in the common search space or the UE-specific search space of the PDCCH and an MCS table conveyed by the DCI.

29. The method of claim 28, further comprising:

sending one or more bits in the DCI, and wherein the modulation order is based at least in part on whether the DCI is sent in the common search space or the UE-specific search space of the PDCCH, the MCS table conveyed by the DCI, and the one or more bits in the DCI.

30. The method of claim 28, wherein the DCI format is one or more of a DCI format 0 or a DCI format 4.

* * * * *